(12) United States Patent
Humphries

(10) Patent No.: US 9,790,853 B2
(45) Date of Patent: Oct. 17, 2017

(54) VARIABLE GEOMETRY POWER TRANSFER FOR FLUID FLOW MACHINES

(71) Applicant: Thomas Steve Humphries, Cedar Rapids, IA (US)

(72) Inventor: Thomas Steve Humphries, Cedar Rapids, IA (US)

(*) Notice: Subject to any disclaimer, the term of this patent is extended or adjusted under 35 U.S.C. 154(b) by 391 days.

(21) Appl. No.: 14/281,352

(22) Filed: May 19, 2014

(65) Prior Publication Data

US 2015/0013648 A1 Jan. 15, 2015

Related U.S. Application Data

(60) Provisional application No. 61/825,362, filed on May 20, 2013, provisional application No. 61/897,011, filed on Oct. 29, 2013.

(51) Int. Cl.
*F02B 75/32* (2006.01)
*F02B 75/04* (2006.01)
*F02F 7/00* (2006.01)
*F02B 41/04* (2006.01)
(Continued)

(52) U.S. Cl.
CPC ........... *F02B 75/048* (2013.01); *F02B 41/04* (2013.01); *F02B 75/045* (2013.01); *F02B 75/32* (2013.01); *F02F 7/0019* (2013.01); *F16H 21/32* (2013.01); *F01B 9/02* (2013.01)

(58) Field of Classification Search
CPC .... F02B 75/048; F02B 75/045; F02B 7/0019; F02F 7/0019
See application file for complete search history.

(56) References Cited

U.S. PATENT DOCUMENTS 1,597,080 A 8/1926 Lewis
1,909,372 A * 5/1933 McCollum ............ F02B 75/32
123/197.1
(Continued)

FOREIGN PATENT DOCUMENTS

DE 102011078648 A1 1/2013
EP 2119889 A1 11/2009
WO WO2009017423 A1 2/2009

OTHER PUBLICATIONS

International Search Report dated Sep. 30, 2014 from counterpart PCT App No. PCT/US2014/038629.
(Continued)

*Primary Examiner* — Kevin A Lathers
(74) *Attorney, Agent, or Firm* — Shuttleworth & Ingersoll, PLC; Timothy J. Klima

(57) ABSTRACT

A fluid flow machine includes a casing including a cylinder and a crankshaft support. A piston is slidably disposed in the cylinder for reciprocating along an axis of the cylinder. A crankshaft includes a main bearing journal rotationally supported in the crankshaft support, a crankpin radially offset from an axis of the main bearing journal and a crank web connecting the main bearing journal and the crankpin. A multi-linkage connecting rod mechanism is connected between the piston and crankpin and includes a connecting rod, a first hinge link and a crankpin link pivotally connected to each other. A force transfer mechanism connects the multi-linkage connecting rod mechanism to the casing for transferring a vertical piston force into a horizontal crankpin force.

42 Claims, 37 Drawing Sheets

(51) Int. Cl.
  *F16H 21/32*      (2006.01)
  *F01B 9/02*       (2006.01)

(56) References Cited

U.S. PATENT DOCUMENTS

| | | | |
|---|---|---|---|
| 1,960,167 A * | 5/1934 | Rokosz | ............... F16H 37/124 |
| | | | 74/32 |
| 4,979,428 A | 12/1990 | Nelson | |
| 6,684,828 B2 | 2/2004 | Ushijima et al. | |
| 7,213,563 B2 | 5/2007 | Yaguchi et al. | |
| 7,992,529 B2 | 8/2011 | Kobayashi et al. | |
| 8,011,343 B2 | 9/2011 | Kobayashi et al. | |
| 8,100,098 B2 | 1/2012 | Takahashi et al. | |
| 8,161,922 B2 | 4/2012 | Watanabe et al. | |
| 8,171,899 B2 | 5/2012 | Watanabe et al. | |
| 8,281,764 B2 | 10/2012 | Gurler | |
| 8,327,819 B2 | 12/2012 | Voegeli | |
| 2009/0139492 A1 | 6/2009 | Lee et al. | |

OTHER PUBLICATIONS

Japanese Office Action dated Jul. 20, 2016 from counterpart Japanese App No. 2016-514992.
International Search Report dated Nov. 24, 2015 from counterpart PCT App No. PCT/US2014/038629.
European Search Report dated Feb. 2, 2017 from counterpart European App No. 14800883.2.

\* cited by examiner

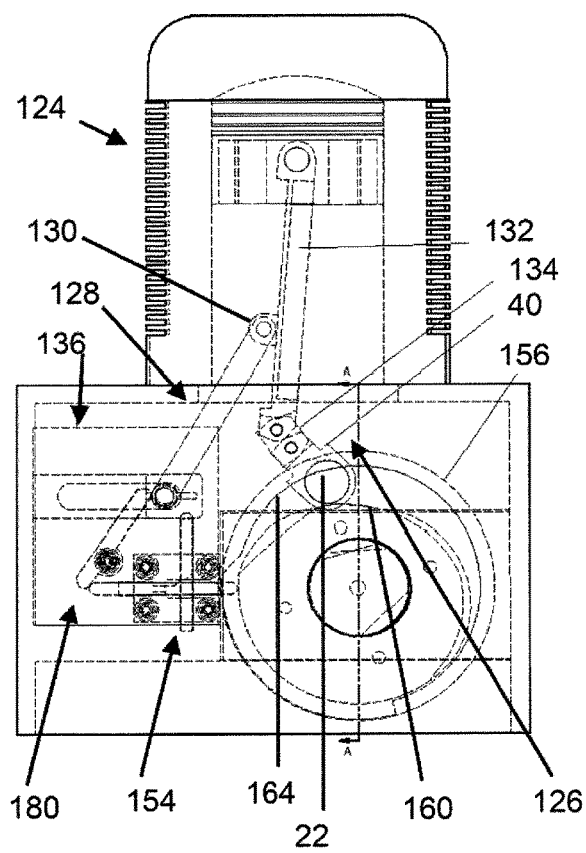
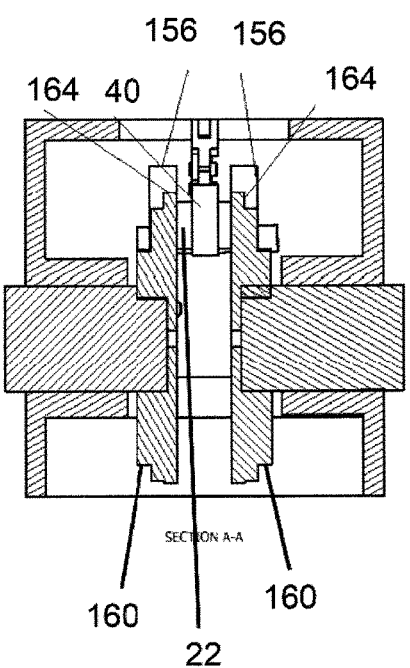
FIG. 15A
FIG. 15B

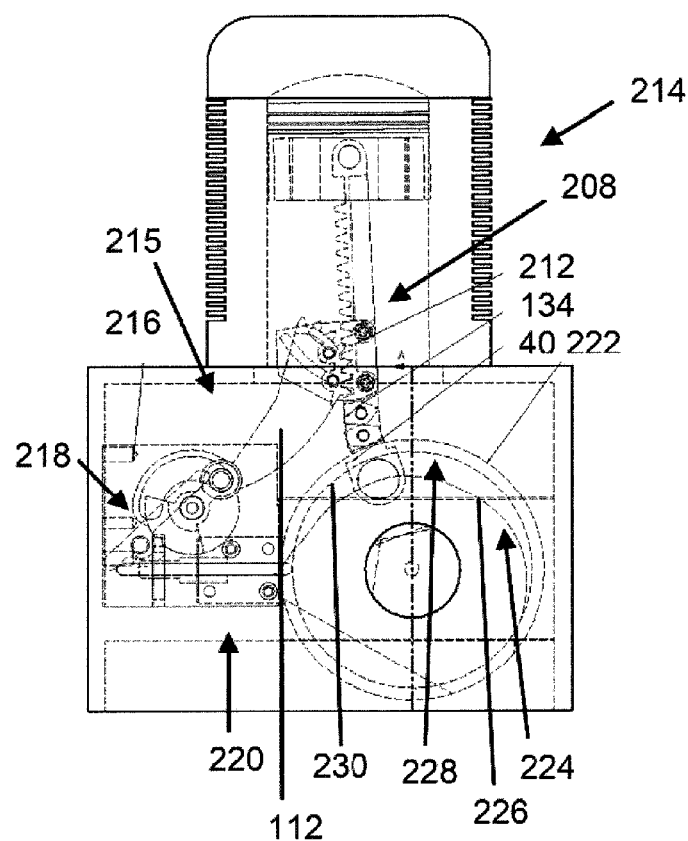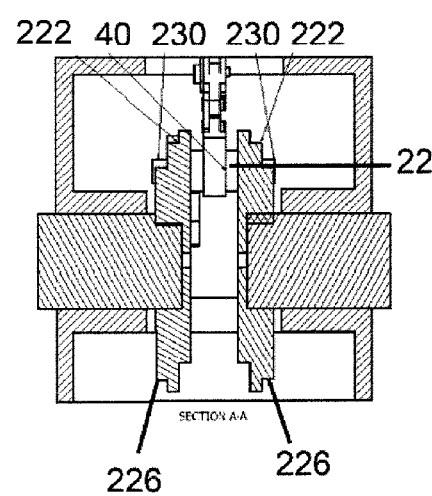
FIG. 26A
FIG. 26B

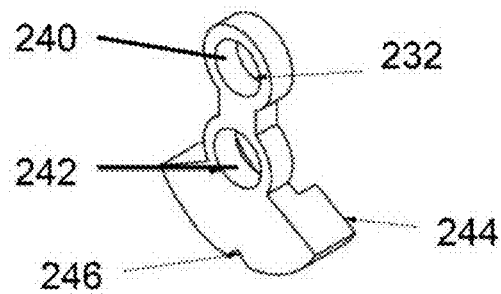
FIG. 28
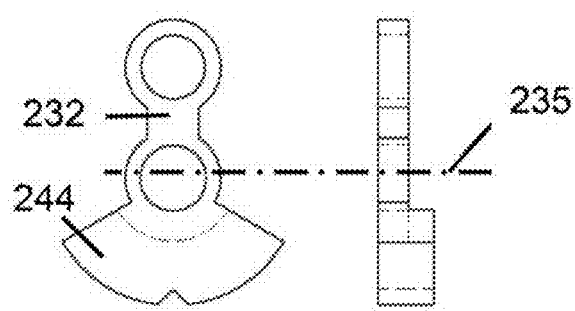
FIG. 29
FIG. 30
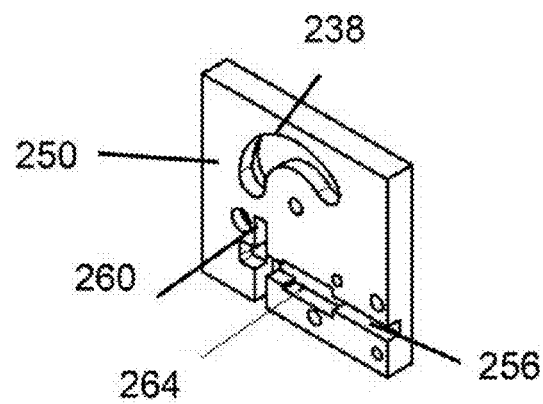
FIG. 31
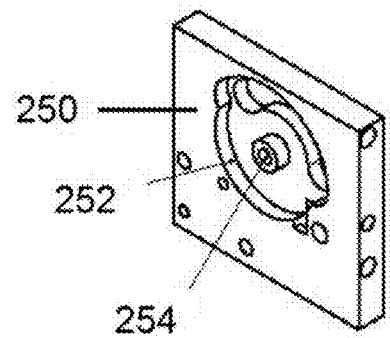

VARIABLE GEOMETRY POWER TRANSFER FOR FLUID FLOW MACHINES

This application claims priority to U.S. Provisional Application No. 61/825,362, filed May 20, 2013 and entitled Efficient Variable Geometry Power Transfer For Combustion Engines; and U.S. Provisional Application No. 61/897,011, filed Oct. 29, 2013 and entitled Efficient Variable Geometry Power Transfer For Combustion Engines, the entirety of both of which applications is incorporated by reference herein.

BACKGROUND OF THE INVENTION

A combustion engine is an engine in which the combustion of fuel and air occurs within a combustion chamber. The combustion process burns the fuel and air mixture to create a gas at high temperature. The high temperature gas creates high pressure that is then used to apply force to a piston to perform work. Because the combustion process generates a gas, the ideal gas law can be used to determine the relationship between temperature, pressure, and volume of the gas.

The ideal gas law is PV=nRT, where
P=pressure
V=volume of the gas
T=temperature
n=number of moles of gas
R=ideal gas constant Given a constant quantity of gas, the pressure of the gas is directly related to its temperature and inversely related to its volume.

Most combustion engines in use today use a crank slider mechanism (CSM) to transfer the power from the linear motion of the piston to circular motion. The CSM includes a piston connected to a crankshaft (crank) by a connecting rod, as is shown in FIG. 1. In FIG. 1, $F_W$ is the force perpendicular to the crank and generates torque T on the crank. Fp is the force on the piston caused by the combustion process. The relationship between T, $F_W$ and Fp is shown as follows:

$$T = F_W * (stroke/2)$$

$F_W$ is related to Fp by the following equation $$F_W = Fp * \sin(180 - \beta - a)$$

FIG. 2 is a graph showing the force $F_W$ as a percentage of force Fp as the crank rotates from angle θ at Top Dead Center (TDC) to 180 degrees at Bottom Dead Center (BDC) for a crank slider with a stroke of 4 inches and a connecting rod 6 inches in length. It can be seen from this graph that $F_W$ is equal to 0 at TDC and increases until $F_W$ is equal to Fp at 65 degrees of crank motion and then decreases until $F_W$ is again 0 at 180 degrees.

According to the ideal gas law, the force on the piston (Fp) varies with the inverse of the volume of the gas. FIG. 3 (Prior Art) is a graph showing the relationship between gas pressure and the crank angle for a typical combustion engine. In this chart, negative degrees are before TDC and positive degrees are after TDC with 0 being TDC. The pressure rises before TDC as the fuel mixture is being compressed into a smaller volume. In addition, for real systems, the fuel mixture takes a finite amount of time to burn requiring the fuel mixture be ignited before TDC. This can be seen in the graph as a change of the slope in the curve as the fuel mixture is ignited at −20 degrees before TDC. FIG. 3 (Prior Art) shows that the pressure peak occurs 5 degrees past TDC but this peak can be moved by igniting the fuel earlier or later in the combustion process. The slope of the pressure decrease after peak is driven by the amount of additional volume in the combustion chamber as the crank rotates.

FIG. 4 (Prior Art) is a graph showing two curves of pressure versus crank angle. The first curve (solid line) has the pressure peak at 5 degrees after TDC and the second curve (dashed line) has the pressure peak at 20 degrees after TDC. The graph shows that the crank angle at which the power peak occurs can be changed but such comes at a price, as the volume of the gas increases the later the fuel mixture is ignited, resulting in a lower overall peak value.

FIG. 5 (Prior Art) is a graph comparing available pressure from the combustion process to the pressure that is converted to do work. The "Pressure Available" curve is derived from the ideal gas law with temperature constant and 100 being the force available at TDC. The pressure available drops as the crank rotates and the volume of the combustion chamber expands. The "CSM" curve is derived from multiplying the CSM percentage of force converted to work times the force available. FIG. 5 shows that close to TDC, there is a great deal of pressure but very little of it is converted to work, which is shown as the large gap between the two curves at the lower crank angles. This comparison shows that at the pressure peak, 0% of the force is used to perform work and by the time 100% of the pressure is converted into work, the pressure is 25% of its peak. Because of this, a conventional crank slider mechanism only converts approximately one half of the available pressure into work.

Engines not having a conventional crank slider mechanism have been proposed in U.S. Pat. No. 6,684,828 to Ushijima; U.S. Pat. No. 7,213,563 to Yaguchi; U.S. Pat. No. 7,992,529 to Kobayashi; U.S. Pat. No. 8,011,343 to Kobayashi; U.S. Pat. No. 8,100,098 to Takahashi; U.S. Pat. No. 8,161,922 to Watanabe; U.S. Pat. No. 8,171,899 to Watanabe; U.S. Pat. No. 8,281,764 to Gurler and U.S. Pat. No. 8,327,819 to Voegeli.

BRIEF SUMMARY OF THE INVENTION

A fluid flow machine includes a casing including a cylinder and a crankshaft support. A piston is slidably disposed in the cylinder for reciprocating along an axis of the cylinder. A crankshaft includes a main bearing journal rotationally supported in the crankshaft support, a crankpin radially offset from an axis of the main bearing journal and a crank web connecting the main bearing journal and the crankpin. A multi-linkage connecting rod mechanism is connected between the piston and crankpin and includes a connecting rod, a first hinge link and a crankpin link pivotally connected to each other. A force transfer mechanism connects the multi-linkage connecting rod mechanism to the casing for transferring a vertical piston force into a horizontal crankpin force.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWINGS

Further objects and advantages of this invention will become more apparent and more readily appreciated from the following detailed description of the present invention, taken in conjunction with the accompanying drawings, of which:

FIG. 15A is a schematic sectional view of an embodiment of the present invention;

FIG. 15B is a schematic sectional view of the embodiment of FIG. 15A taken along section line A-A;

FIG. 26A is a schematic sectional view of an embodiment of the present invention;

FIG. 26B is a schematic sectional view of the embodiment of FIG. 26A taken along section line A-A;

FIG. 28 is a perspective view of a movable mount of the embodiment of FIG. 26A;

FIG. 29 shows side and edge views of the movable mount of FIG. 28;

FIG. 30 is a perspective view of a second side of the moving pivot point housing of the embodiment of FIG. 26A;

FIG. 31 is a perspective view of a first side of the moving pivot point housing of FIG. 30;

DETAILED DESCRIPTION OF THE INVENTION

Figure 1:
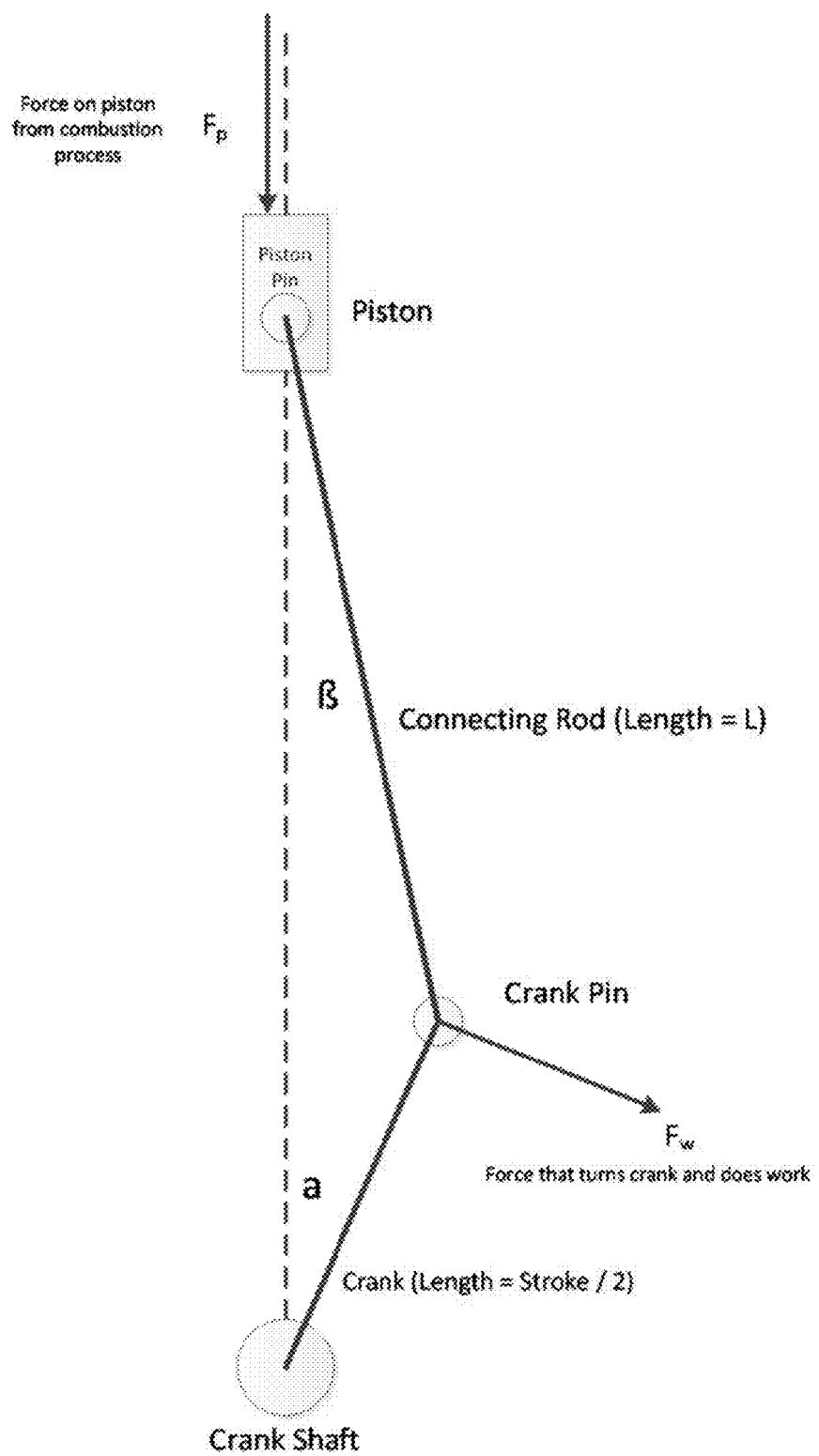
FIG. 1 (Prior Art) shows a force diagram for a conventional piston combustion engine.
Figure 2:
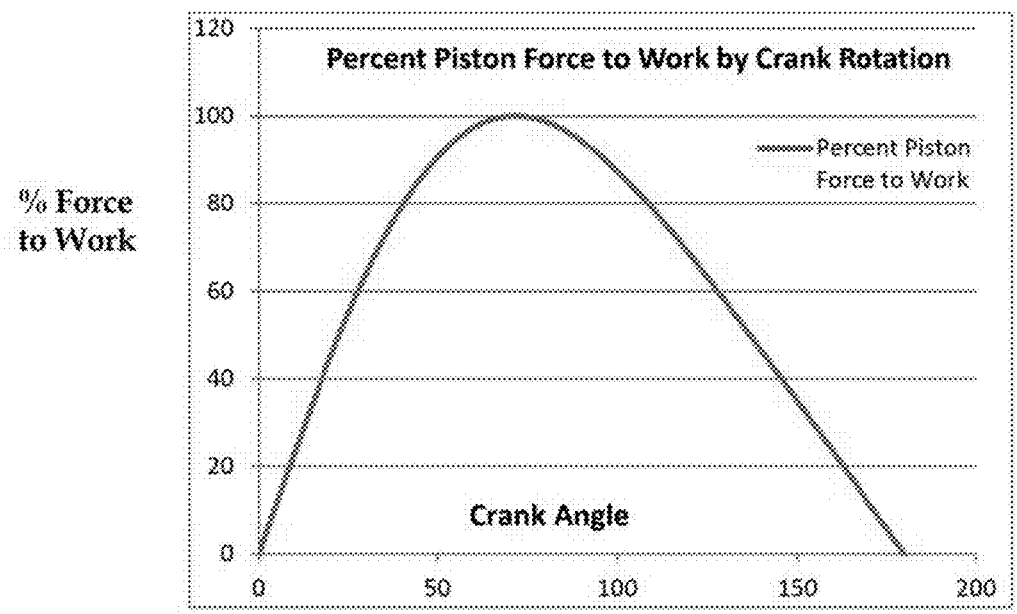
FIG. 2 (Prior Art) is a graph showing percent of piston force to work by crank angle.
Figure 3:
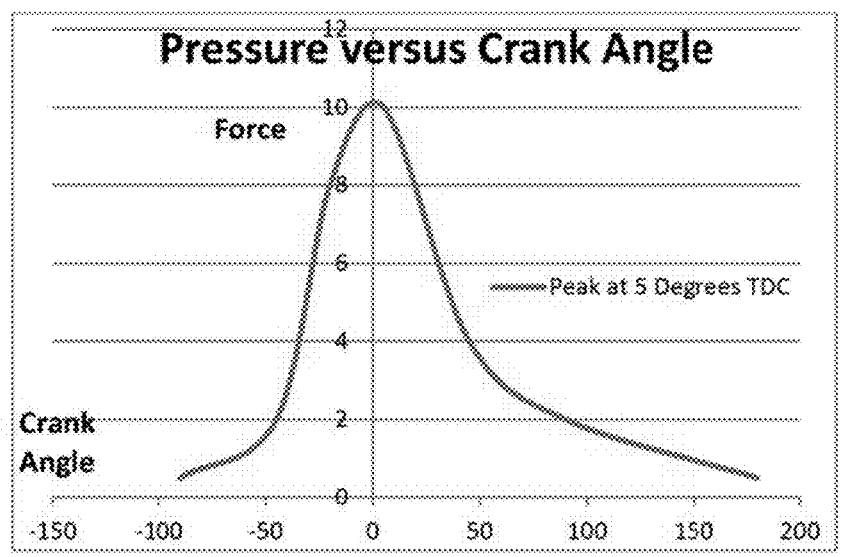
FIG. 3 (Prior Art) is a graph showing the relationship between gas pressure and crank angle for a typical combustion engine.
Figure 4:
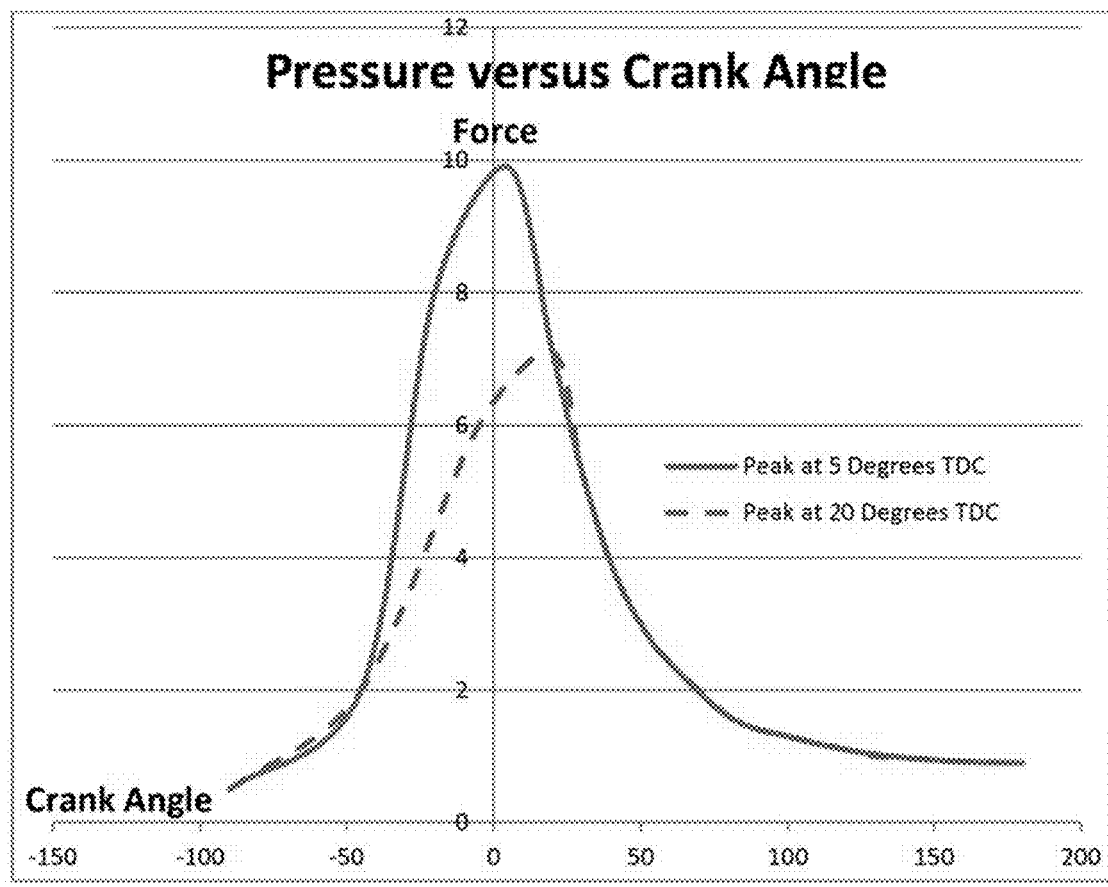
FIG. 4 (Prior Art) is a graph showing two curves of pressure versus crank angle.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 5:
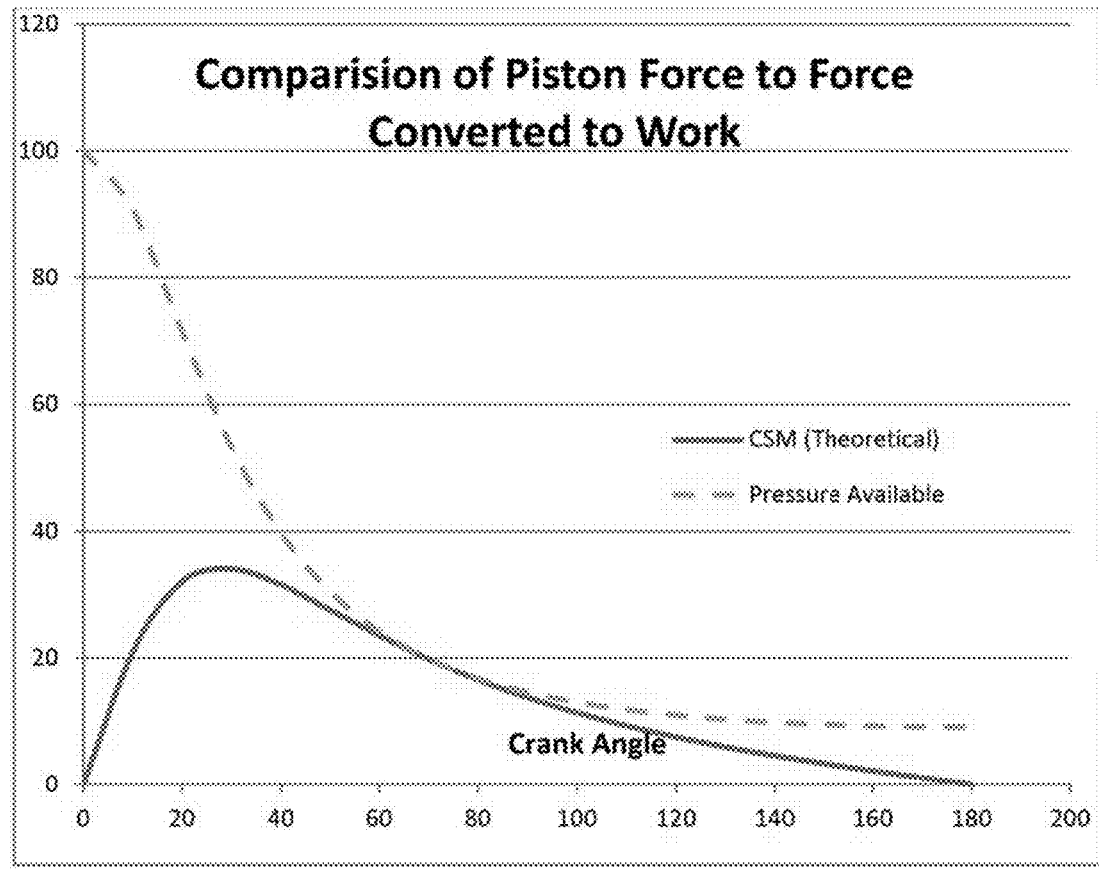
FIG. 5 (Prior Art) is a graph comparing available pressure from the combustion process to the pressure that is converted to do work.

One objective is to increase gas mileage of combustion engines by changing how the piston force is harnessed to accomplish work. This can be done by doing the following during the power stroke:

Use the majority of the available piston force to do work by efficiently transferring the piston force close to TDC where the pressure is at its maximum (see FIG. 5).

Maximize the force peak by igniting the fuel mixture so that the pressure peak occurs close to TDC.

Use geometry to maintain the piston force peak longer while rotating the crank.

Since torque is equal to force times crank radius, use a larger crank to create more torque from the available piston force.

Figure 6:
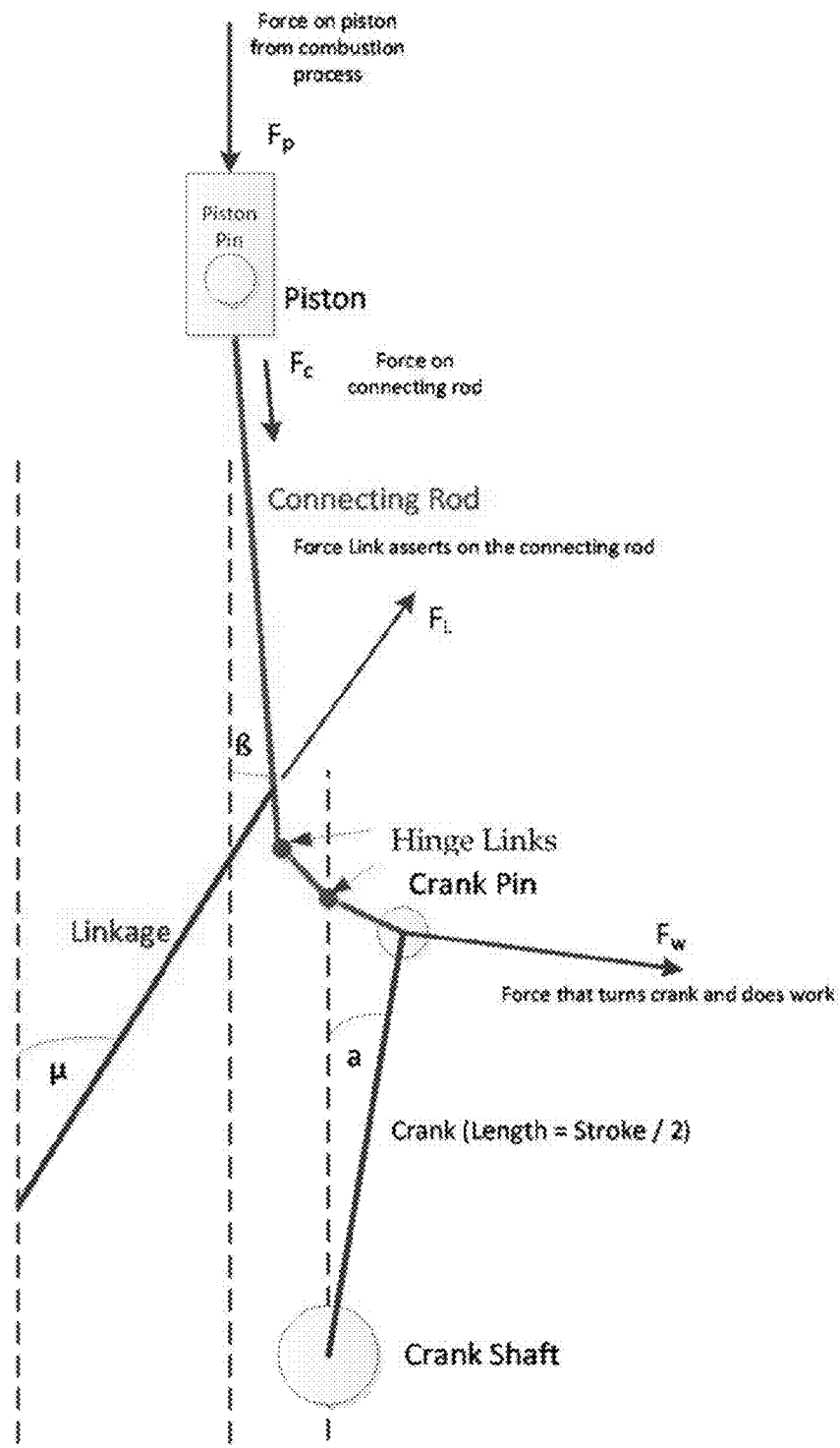
FIG. 6 shows a force diagram of an embodiment of the machine of the present invention.

FIG. 6 shows a force diagram of an embodiment of the machine of the present invention. This embodiment uses a crank and connecting rod, as does the crank slider mechanism shown in FIG. 1, but introduces a multi-linkage connecting rod mechanism and a force transfer mechanism used to efficiently transfer force when the crank angle is less than 45 degrees, when the pressure is at its maximum and the conventional crank slider mechanism is least efficient. The force transfer mechanism can have different configurations, including a non-circular gear mechanism and a linkage mechanism. FIG. 6 shows a force diagram with the linkage mechanism. For analysis in this document, an elliptical gear is used as the non-circular gear mechanism since its shape is easily defined.

The multi-linkage connecting rod mechanism ("MLCR") includes additional hinge links between the connecting rod and the crankshaft. This change allows the main connecting rod to descend in relation to the crank. The need for this can be visualized by looking at FIG. 6. If the hinge links were not present and $\alpha=\beta=0$, then the crank would not allow the connecting rod to transfer force to the force transfer mechanism, stopping the transfer of force used to turn the crank.

In addition, the piston is no longer on the same centerline as the crank, as compared to a conventional crank slider mechanism. Offsetting the centerline provides additional space for the hinge. While an offset centerline provides advantages, the present machine will also work with a piston and crank on the same centerline, if required for a specific application. Different approaches can be used to reset the geometry of the multi-linkage connecting rod mechanism and the force transfer mechanism, as will be discussed in further detail below.

The simple linkage force transfer mechanism of FIG. 6 will first be analyzed. By using a static force analysis and summing the horizontal and vertical forces, the relationship between piston force and force harnessed to turn the crank can be determined for this embodiment:

$FC = FP * Cos(\beta)$ $FC * Cos(\beta) = F_W * Cos(90-a) + FL * Cos(\mu)$ $FC * Sin(\beta) + FL * Sin(\mu) = F_W * Sin(90-a)$ Evaluating the relationship for the initial condition when $\alpha=\beta=0$ and for $\mu$ equal to 45 degrees shows that $F_W$ is equal to 50% of piston force FP for this initial condition. This is the initial transfer rate and will increase dramatically as the crank is rotated. The simple linkage force transfer mechanism is the least efficient at harnessing piston force of the embodiments described herein but has the advantage of being the least costly to implement. Variations of this embodiment are possible. One has a force transfer mechanism having a fixed pivot point. One has a force transfer mechanism having a moveable pivot point.

Figure 7:
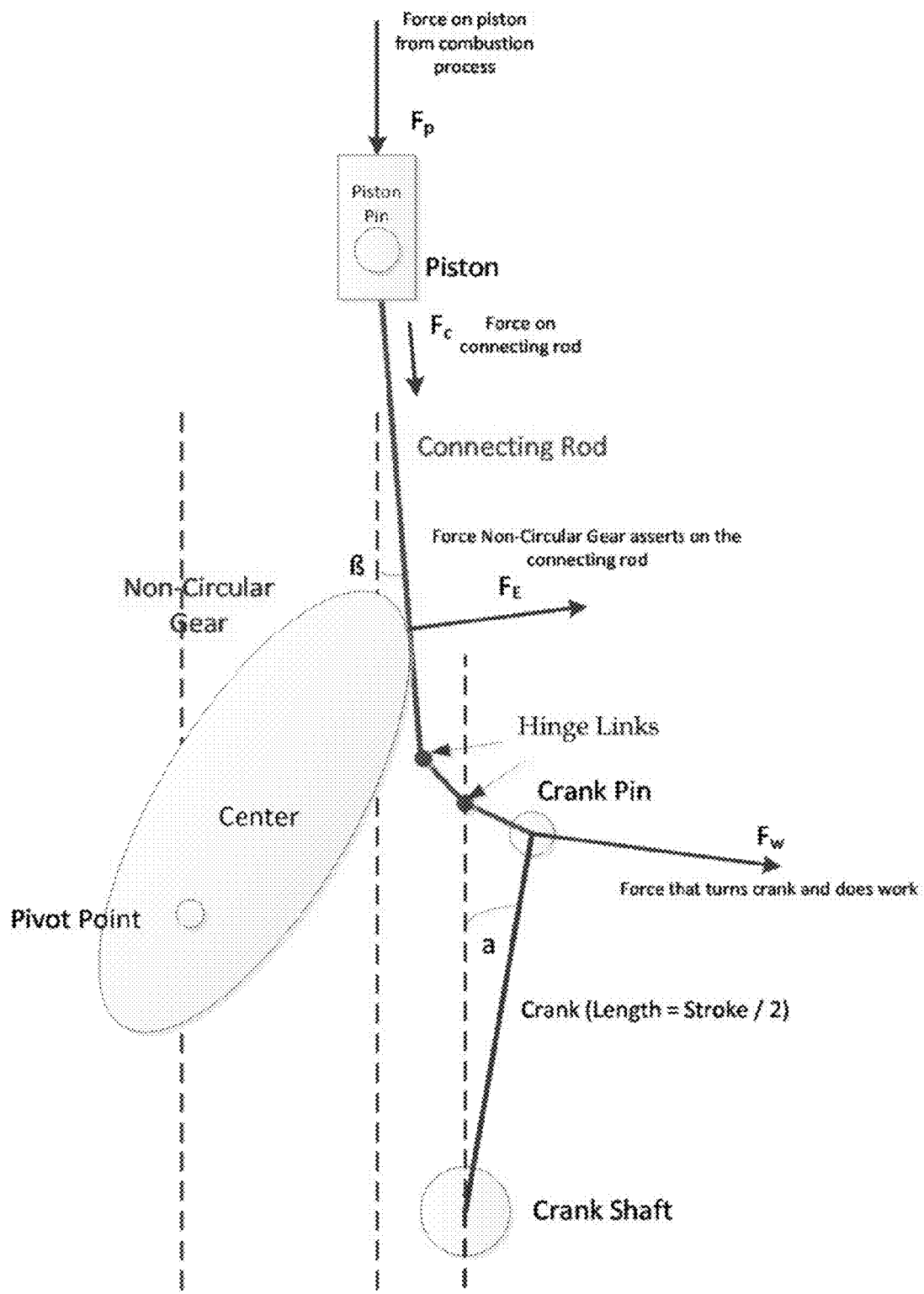
FIG. 7 shows a force diagram for a non-circular gear force transfer mechanism.

A force diagram for a non-circular gear force transfer mechanism is shown in FIG. 7. Comparing FIG. 7 to FIG. 6, it can be seen that the simple linkage force transfer mechanism of FIG. 6 has been replaced with a non-circular gear mechanism in FIG. 7. With the non-circular gear mechanism, the connecting rod force FC is transferred to the non-circular gear causing it to turn and as the non-circular gear turns its radius changes, creating force FE. The percentage of force transferred from FC to FE depends on multiple aspects, including the relationship between the major and minor radiuses of the non-circular gear, the gear tooth profile, the pivot point offset from the center of the non-circular gear, and the angle between the connecting rod and the non-circular major axis. When the piston is close to TDC, a non-circular gear, along with the multi-linkage connecting rod mechanism, is able to transfer a majority of the vertical piston force into horizontal force, thereby harnessing the piston's force at peak pressure.

Figure 8:
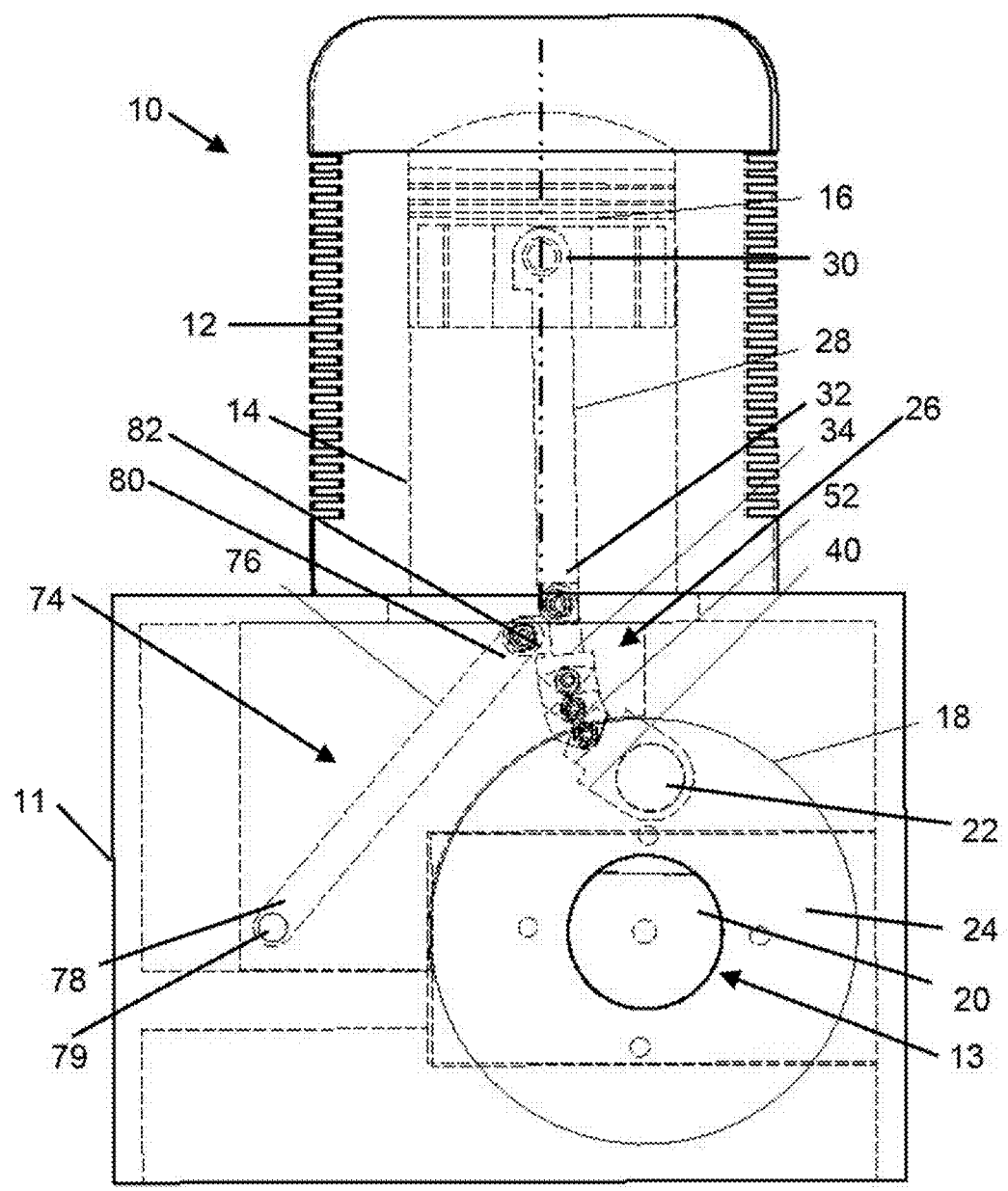
FIG. 8 is a schematic sectional view of an embodiment of the present invention.

FIG. 8 shows a first embodiment. The engine 10 has a casing 11 which includes a cylinder 12 and a crankshaft support 13. The casing 11 can have a unitary construction or include a number of separate components attached together, such as a crankcase and cylinder. The cylinder 12 has a bore 14 in which a piston 16 is slidingly reciprocally disposed. A crankshaft 18 includes a main bearing journal 20 rotationally supported in the crankshaft support 13 and a crankpin 22 radially offset from an axis of the main bearing journal. A crank web 24 connects the main bearing journal 20 and the crankpin 22. The engine includes other components as would be known to a person of ordinary skill in the art and those components are not described herein. Also, the embodiments disclosed below use many of the same components, or similar components as this embodiment. Therefore, repeat descriptions of components or portions of components may be omitted below when the components or portions of components are the same or similar to components or portions of components already described herein.

A multi-linkage connecting rod mechanism 26 ("MLCR", see also FIG. 9) includes a connecting rod 28 having a first end 30 connected to the piston 16 and a second end 32 opposite the first end 30, the connecting rod 28 for reciprocating with the piston 16. A first hinge link 34 includes a first end 36 pivotally connected to the connecting rod second end 32 and a second end 38 opposite the first hinge link first end 36. A crankpin link 40 includes a first end 42 and a second end 44 rotationally connected to the crankpin 22. In one embodiment, the multi-linkage connecting rod mechanism 26 also includes a second hinge link 46 with a first end 48 pivotally connected to the first hinge link second end 38 and a second end 50 pivotally connected to a first end 54 of a third hinge link 52. The third hinge link 52 also includes a second end 56 pivotally connected to the crankpin link first end 42.

Alternatively, the crankpin link first end 42 can be pivotally connected directly to the first hinge link second end 38, and the second hinge link 46 and third hinge link 52 omitted. The crankpin link first end 42 can also be pivotally connected directly to the second hinge link 46 and the third hinge link 52 omitted. Any number of hinge links can be used between the connecting rod 28 and the crankpin link 40.

The pivoting connections between the connecting rod, hinge links and crankpin link can have alternative constructions. In one embodiment, the connecting rod 28 has a unitary second end 32 which is inserted in a slot of the first hinge link first end 36. The slot can be formed from a fork or clevis construction of the first hinge link and/or can be formed by separate portions (or halves) of the first hinge link sandwiching the connecting rod second end 32. The components can also have a layered construction and be assembled in an interleaving manner with respect to adjacent components. Respective pins 58, 60, 62 and 64 engage between bores in the respective portions of the connecting rod, hinge links and crankpin link to provide the pivotal connections thereto.

The first hinge link 34 also includes a stop face 66 for engaging a stop face 68 of the third hinge link 52. These stop faces 66 and 68 can engage one another when the first hinge link 34 pivots in one direction with respect to the third hinge link 52 to provide a positive stop to the extent of such pivoting and prevent further pivoting in that direction. The second hinge link 46 also includes a stop face 70 for engaging a stop face 72 of the crankpin link 40 to provide a positive stop to the pivoting of those components with respect to one another. There can also be counterpart engaging stop faces on the connecting rod and in other positions of the other components of the multi-linkage connecting rod mechanism to also limit pivoting in a direction and can have counterpart stop faces on an opposite side of the components to limit pivoting in the opposite direction as well. Although the stop faces provide a limit to the pivoting, in operation, the MLCR need not pivot to the maximum limit. The total range of pivoting of the connecting rod 28 with respect to the crankpin link 40 will usually be within a range of approximately 0-90° in either direction, as measured between longitudinal axes of the connecting rod and the crankpin link. An amount of pivoting allowed in one direction can be different from an amount of pivoting allowed in the opposite direction. The amount of pivoting between one component and another can be different than an amount of pivoting between one of those components and another component, or between two other components.

The engine also includes a force transfer mechanism 74 (see FIG. 8) connecting the multi-linkage connecting rod mechanism 26 to the casing 11 for transferring a vertical piston force into a horizontal crankpin force. The force transfer mechanism 74 includes a pivot link 76 including a first end 78 pivotally connected to the casing 11 at fixed/stationary pivot point 79 and a second end 80 pivotally connected to a third pivot connection 82 of the first hinge link 34. Alternatively, the connecting rod 28 or other components of the multi-linkage connecting rod mechanism can have the third pivot connection for connection to the pivot link second end 80. The third pivot connection 82 is positioned on a major thrust side (on the left in FIG. 8) of the first hinge link 34 and the pivot link first end 78 is pivotally connected to the casing 11 on the major thrust side of the first hinge link 34. The pivot connections can be provided in any manner, using pins, bolts other threaded fasteners to provide the pivot mount, and can use bearings and/or bushings between the pivot mount and the pivoting component to reduce friction and wear.

Figure 10A:
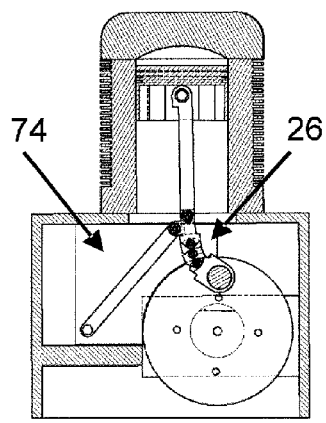
FIG. 10A shows a first position in a sequence of six positions for the engine of FIG. 8 as the engine rotates through a revolution.
Figure 10B:
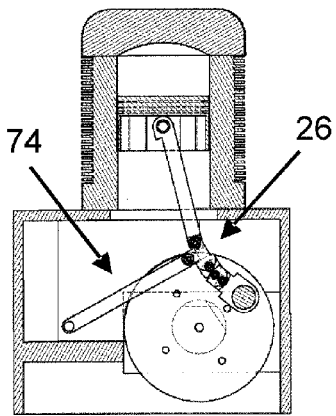
FIG. 10B shows a second position in the sequence of six positions for the engine of FIG. 8 as the engine rotates through a revolution.
Figure 10C:
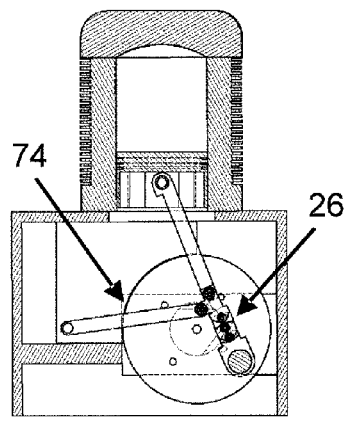
FIG. 10C shows a third position in the sequence of six positions for the engine of FIG. 8 as the engine rotates through a revolution.
Figure 10D:
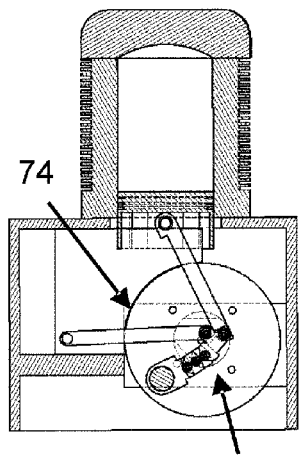
FIG. 10D shows a fourth position in the sequence of six positions for the engine of FIG. 8 as the engine rotates through a revolution.
Figure 10E:
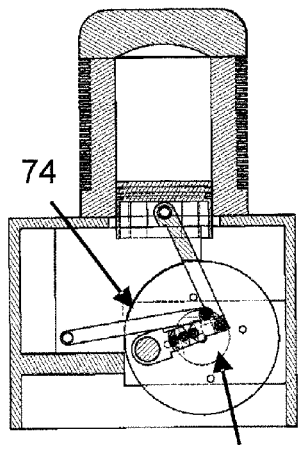
FIG. 10E shows a fifth position in the sequence of six positions for the engine of FIG. 8 as the engine rotates through a revolution.

FIGS. 10A-10F show a sequence of six positions for the engine 10 as the engine rotates through a revolution. FIG. 10A shows the power stroke of the engine 10 close to TDC. The initial pivot angle between the connecting rod 28 and the crankpin link 40 is 45 degrees, which will harness 50% of the available piston force. As the piston 16 is pushed down during the power stroke, the piston force is transferred to the MLCR 26 while the force transfer mechanism 74 transfers the piston force to the crankpin 22 which turns the crankshaft 18. Thus, the downward piston force is more rapidly converted to a sideways force acting on the crankpin 22 at this important initial stage of the power stroke. FIGS. 10B-10F show the changing shape of the MLCR 26 during the down stroke and then the raising of the piston and the resetting of the force transfer mechanism 74 and MLCR 26 during the up stroke. During the down stroke, the MLCR 26 will straighten out as the crank rotates. See FIG. 10C and compare with FIGS. 10A and 10B. FIG. 10D shows that during the initial phase of the up stroke of the crankshaft 18, the piston 16 continues to descend as the angle of the MLCR 26 changes.

As the crankshaft rotates past 180 degrees of rotation and the MLCR approaches horizontal at the end of the power stroke (FIGS. 10C-10D), the pivot link 76 can obstruct the path of the MLCR 26. Adding the pivot connection at pin 58 between the connecting rod 28 and the first hinge link 34 allows the MLCR 26 to bend around the pivot link 76 (FIG. 10D).

Figure 10F:
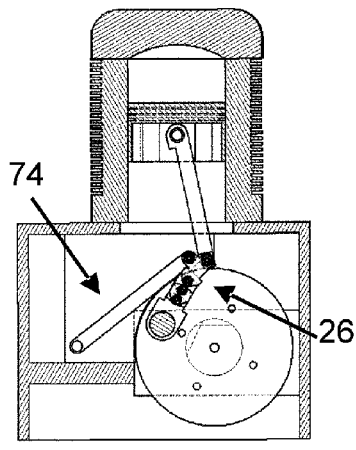
FIG. 10F shows a sixth position in the sequence of six positions for the engine of FIG. 8 as the engine rotates through a revolution.

As the crankshaft 18 continues rotation, the piston 16 will start to rise again (FIG. 10E) with the crankpin link 40 or other portion of the MLCR 26 contacting the pivot link 76 and causing it to rise to return to its default angle at TDC. FIG. 10F shows the resetting of the force transfer mechanism 74 and MLCR 26. As the engine moves from the position in FIG. 10F to the position in FIG. 10A, the force transfer mechanism 74 and MLCR 26 stops the upward motion of the piston 26 to prevent contact of the piston 16 with a head portion of the cylinder 12 and to reverse the direction of movement of the piston 16 for the down stroke.

While this example and the examples below are discussed in terms of engines, and particularly internal combustion reciprocating piston engines, the invention is applicable to other types of reciprocating piston fluid flow machines.

Figure 11:
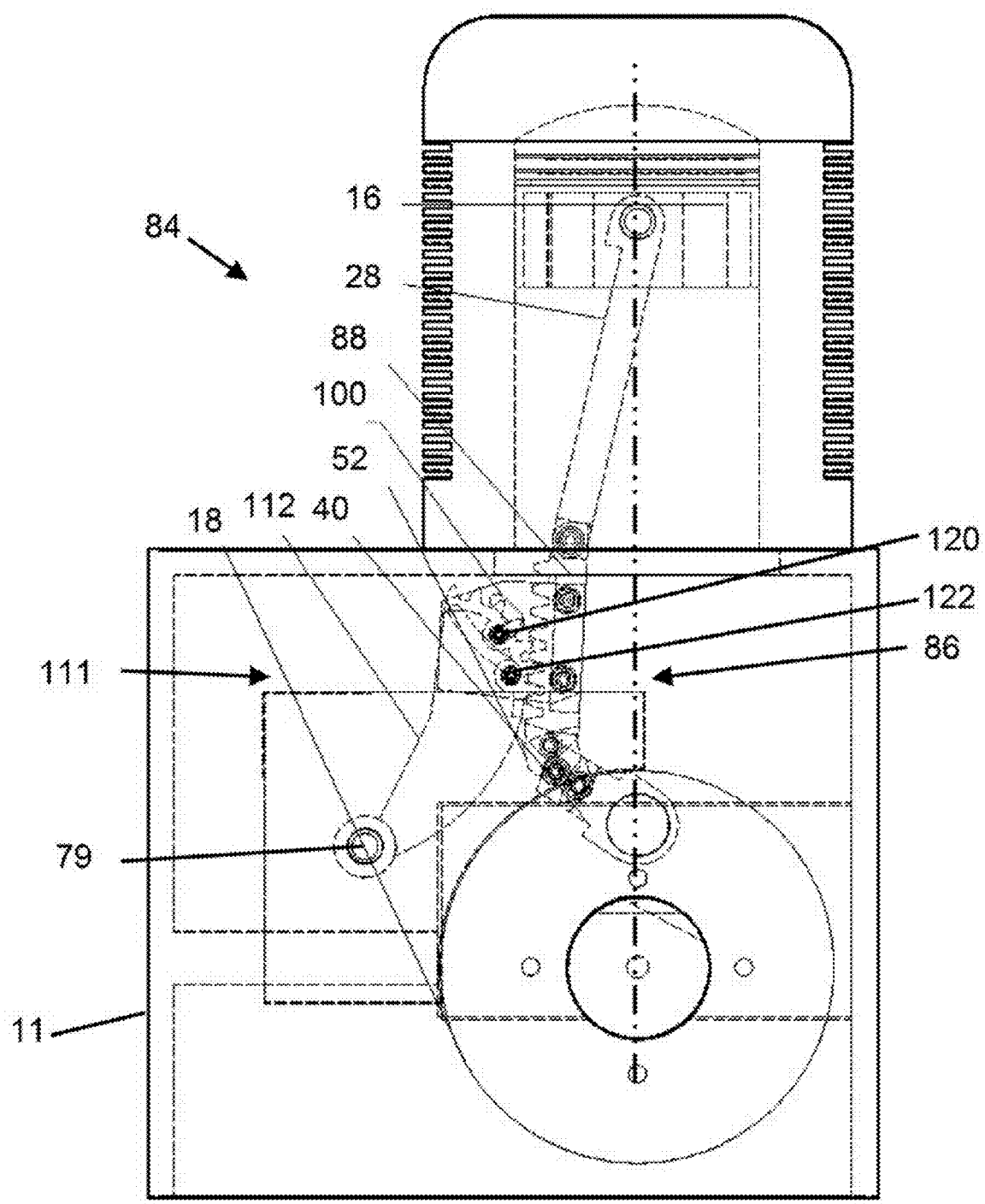
FIG. 11 is a schematic sectional view of an embodiment of the present invention.
Figure 12:
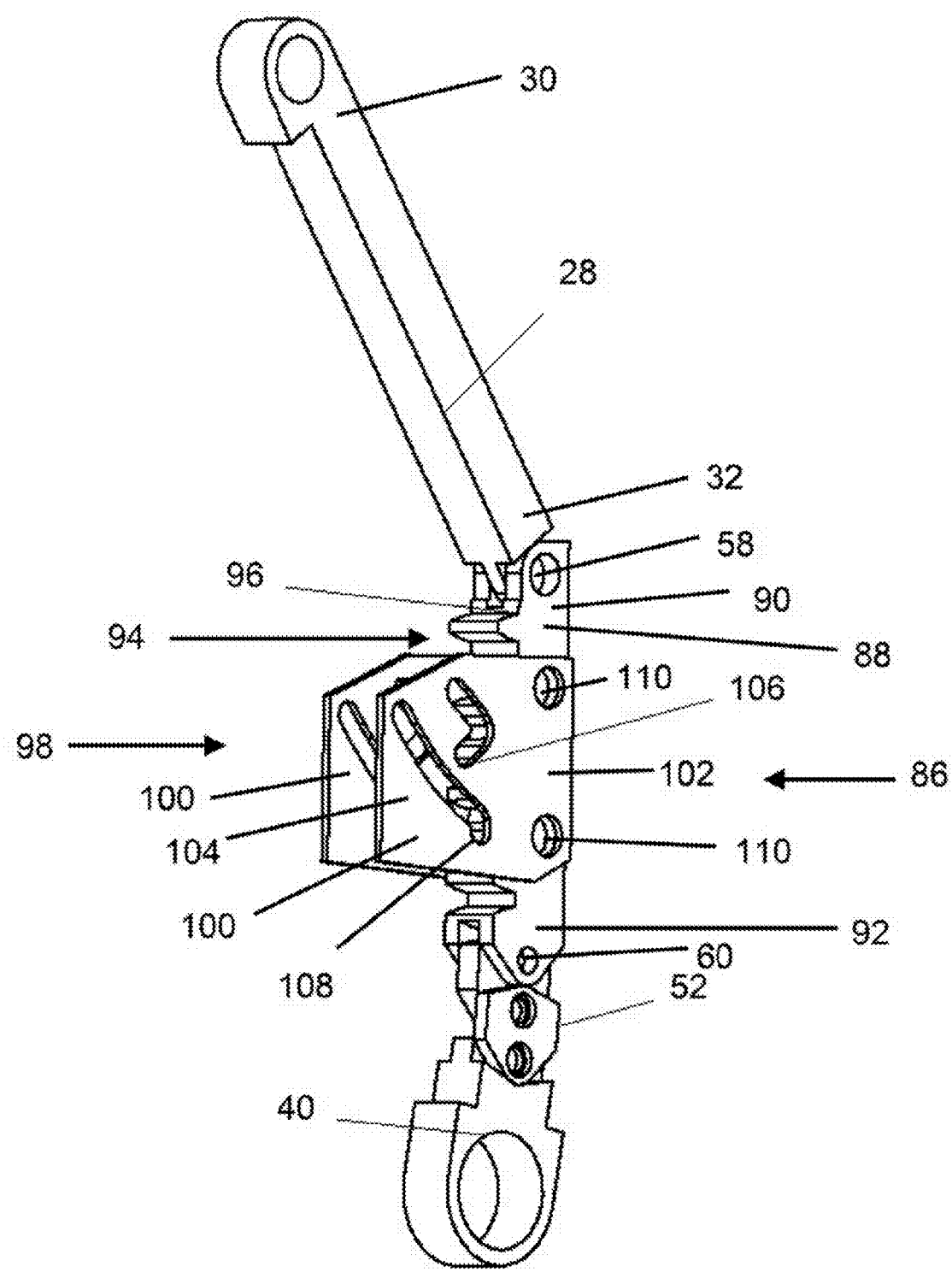
FIG. 12 is a schematic detail view of a multi-linkage connecting rod mechanism of the embodiment of FIG. 11.
Figure 13:
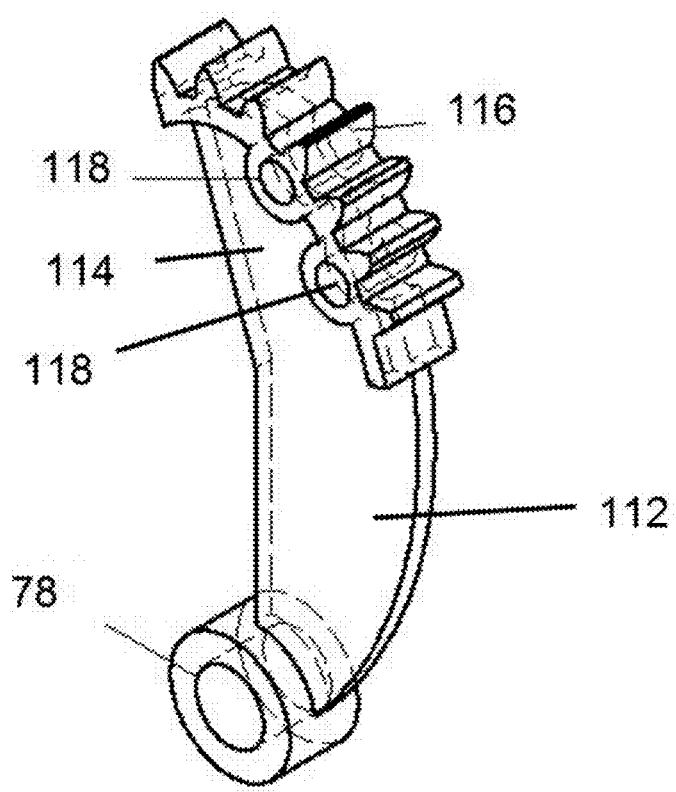
FIG. 13 is a schematic detail view of a force transfer mechanism of the embodiment of FIG. 11.

FIG. 11 shows a schematic view of a further engine 84 and FIG. 12 shows a schematic detail view of a multi-linkage connecting rod mechanism 86 of the embodiment of FIG. 11. The multi-linkage connecting rod mechanism 86 ("MLCR") includes a connecting rod 28 having a first end 30 connected to the piston 16 and a second end 32 opposite the first end 30, the connecting rod 28 for reciprocating with the piston 16.

A first hinge link 88 includes a first end 90 (FIG. 12) pivotally connected to the connecting rod second end 32 and a second end 92 opposite the first hinge link first end 90. The second end 92 is pivotally connected to the second hinge link first end 48 (previously shown in FIG. 9). The third pivot connection 94 includes a first gear portion 96. The force transfer mechanism 111 includes pivot link 112 having first end 78 and second end 114. Pivot link second end 114 includes a second gear portion 116 engaging the first gear portion 96 in a meshing connection that allows the first hinge link 88 to pivot with respect to the pivot link 112 as the connecting rod 28 reciprocates. The first gear portion 96 is a rack gear and the second gear portion 116 is a curved non-circular gear having a different radius in an x-axis than a y-axis, although other gear arrangements can be used. Positioning of the gear portions, as well as other components of the various embodiments can also be reversed without departing from the scope of the invention.

A retention mechanism 98 is connected between the first hinge link 88 and the pivot link 112 to maintain the first gear portion 96 in meshing engagement with the second gear portion 116 throughout a range of pivoting of the multi-linkage connecting rod mechanism 86 with respect to the pivot link 112. The retention mechanism 98 includes two side plates 100, each having a first end 102 and a second end 104. Each side plate 100 is fixedly attached on the first end 102 to the MLCR 86 (here the first hinge link 88) with side plate connectors 110, which can be pins, threaded connections, cast or welded connections or other types of connections. Each side plate 100 includes a first slot 106 and a second slot 108 positioned on the second end 104. Pivot link 112 includes a pair of retention bores 118 for securing retention pins 120 (see FIG. 11). The retention pins 120 and 122 engage the first and second slots 106 and 108, respectively, to maintain the curved non-circular gear in meshing engagement with the rack gear throughout a range of pivoting of the multi-linkage connecting rod mechanism with respect to the pivot link. The shape of the slots is configured to provide the desired meshing engagement between the gear portions as they move through their cycles. The retention pins 120 and 122 are located at different points on the pivot link 112 and follow different paths during gear rotation. This prevents separation of the non-circular gear 116 from the rack gear 96 as at least of the pins 120 and 122 limits the movement of the two gears away from one another.

In this embodiment, as can be seen in FIG. 11, the piston center line is brought closer in line with the crankshaft center line, and in one variation, is aligned with the crankshaft centerline. This is different from the fixed pivot point link force transfer alternative of FIGS. 8-10. By lining up the crankshaft and piston center lines, the engine 84 is able to be narrower and the MLCR 86 is not required to bend at extreme angles during the up stroke to get around the force transfer mechanism 111. A disadvantage of aligning the center lines is that the MLCR 86 at TDC is bent slightly (See FIG. 14B) which reduces force transfer efficiency close to TDC compared to optimal efficiency. However, even with this disadvantage, this alternative is still more efficient that the embodiment of FIGS. 8-10.

Figure 14A:
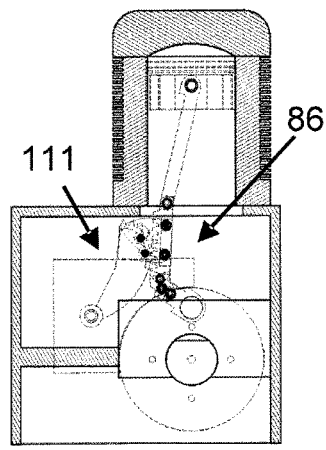
FIG. 14A shows a first position in a sequence of six positions for the engine of FIG. 11 as the engine rotates through a revolution.
Figure 14B:
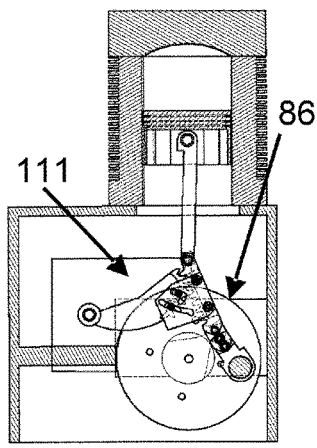
FIG. 14B shows a second position in the sequence of six positions for the engine of FIG. 11 as the engine rotates through a revolution.
Figure 14C:
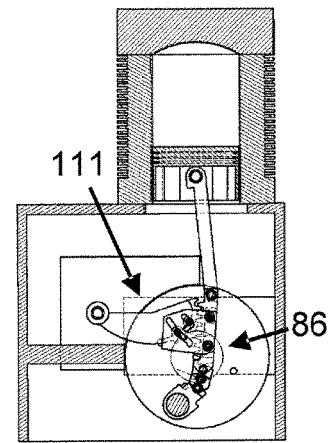
FIG. 14C shows a third position in the sequence of six positions for the engine of FIG. 11 as the engine rotates through a revolution.
Figure 14D:
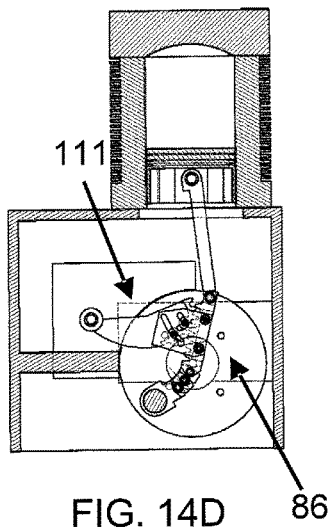
FIG. 14D shows a fourth position in the sequence of six positions for the engine of FIG. 11 as the engine rotates through a revolution.
Figure 14E:
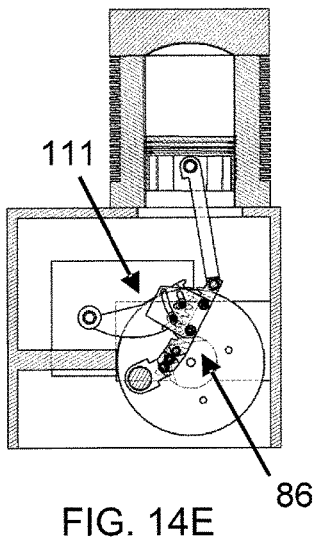
FIG. 14E shows a fifth position in the sequence of six positions for the engine of FIG. 11 as the engine rotates through a revolution.
Figure 14F:
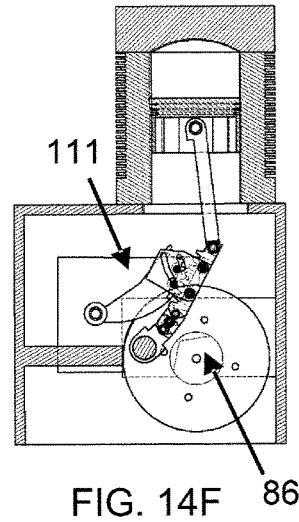
FIG. 14F shows a sixth position in the sequence of six positions for the engine of FIG. 11 as the engine rotates through a revolution.

FIG. 13A-13F show a sequence of six positions for the engine 84 as the engine 84 rotates through a revolution, including the changing shape of the MLCR 86 during the down stroke, and the raising of the piston and the resetting of the force transfer mechanism 111 and MLCR 86 during the up stroke. During the down stroke, the MLCR 86 will straighten out as the crankshaft 18 rotates. FIGS. 14C and 14D show that this embodiment does not cause the piston 16 to drop during the initial stages of the up stroke, as the previous embodiment of FIGS. 8-10 does. In addition, this alternative reduces piston stroke for a fixed crank stroke compared to the previous embodiment. As the engine moves between the positions of FIGS. 14F and 14A, when the piston 16 approaches TDC, the force transfer mechanism 111 including non-circular gear 116, retention mechanism 98, and MLCR 86 stop the upward motion of the piston 16. FIG. 14A shows the engine 84 close to TDC. During the power stroke, the piston force is transferred to the MLCR 86, which in combination with the force transfer mechanism 111, transfers the force to the crank pin which turns the crank.

The above discussed fixed pivot point alternatives are the simplest to implement and require less reciprocating mass than sliding pivot point alternatives. The drawback of these fixed pivot point alternatives is that they can require difficult connecting rod angles during the up stroke to move past the force transfer mechanism. These difficult angles require more work to raise the piston and can cause the piston stroke to be longer than that for sliding pivot point alternatives discussed below.

In alternative embodiments, the engine uses a sliding pivot point, as opposed to the alternatives discussed above using the fixed pivot point 79. This allows the pivot point to move during the up stroke so that the force transfer mechanism is moved out of the way of the MLCR. This movement allows the MLCR to maintain shallow angles during the up stroke, reducing the required force to move the piston. The shallower angles can allow the MLCR to bend in only one direction. This has the advantage of a larger crank stroke than the piston stroke, as the changing shape of the MLCR can be taken advantage of during the down stroke. In addition, during 360 degrees of crankshaft rotation, the piston 16 spends more time close to TDC during the up stroke compared to the fixed pivot point alternatives or a conventional crank slider mechanism. The more time spent close to TDC during the compression stroke allows more time for the fuel mixture to burn. This allows the fuel mixture to reach a higher temperature earlier in the combustion process, which increases the pressure peak, as the volume is smallest in the early phases of the power stroke.

In embodiments disclosed below, each of the sliding pivot point alternatives includes three components. The first is a sliding mechanism used to control the path the pivot point takes when it is moving. The second is a locking mechanism used to lock the sliding mechanism into position during the down stroke; the last component is a motion control mechanism used to ensure that the links of the MLCR stay locked during the up stroke. There are many ways to lock the pivot point and control its motion during movement. Alternatives are described later below.

FIG. 15 shows a schematic sectional view of an engine incorporating a sliding pivot point in the force transfer mechanism. Engine 124 includes an MLCR 126 and a force transfer mechanism 128. The MLCR 126 is similar to the MLCR 26 of FIGS. 8-10, but in this embodiment, the third pivot connection 130 is provided on the connecting rod 132. Also, this embodiment uses only one hinge link 134 between the connecting rod 132 and the crankpin link 40. See FIG. 17.

Figure 16:
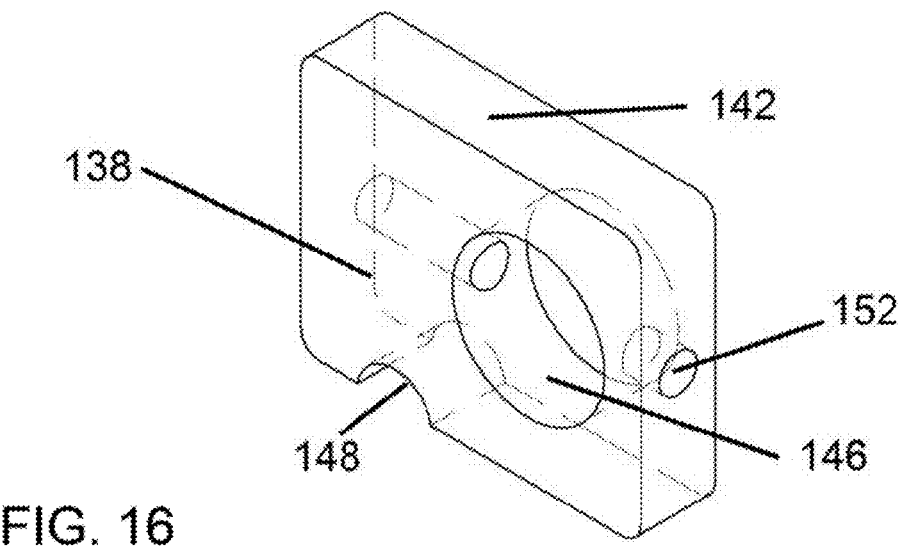
FIG. 16 is a perspective view of a movable mount of the embodiment of FIG. 15A.
Figure 17:
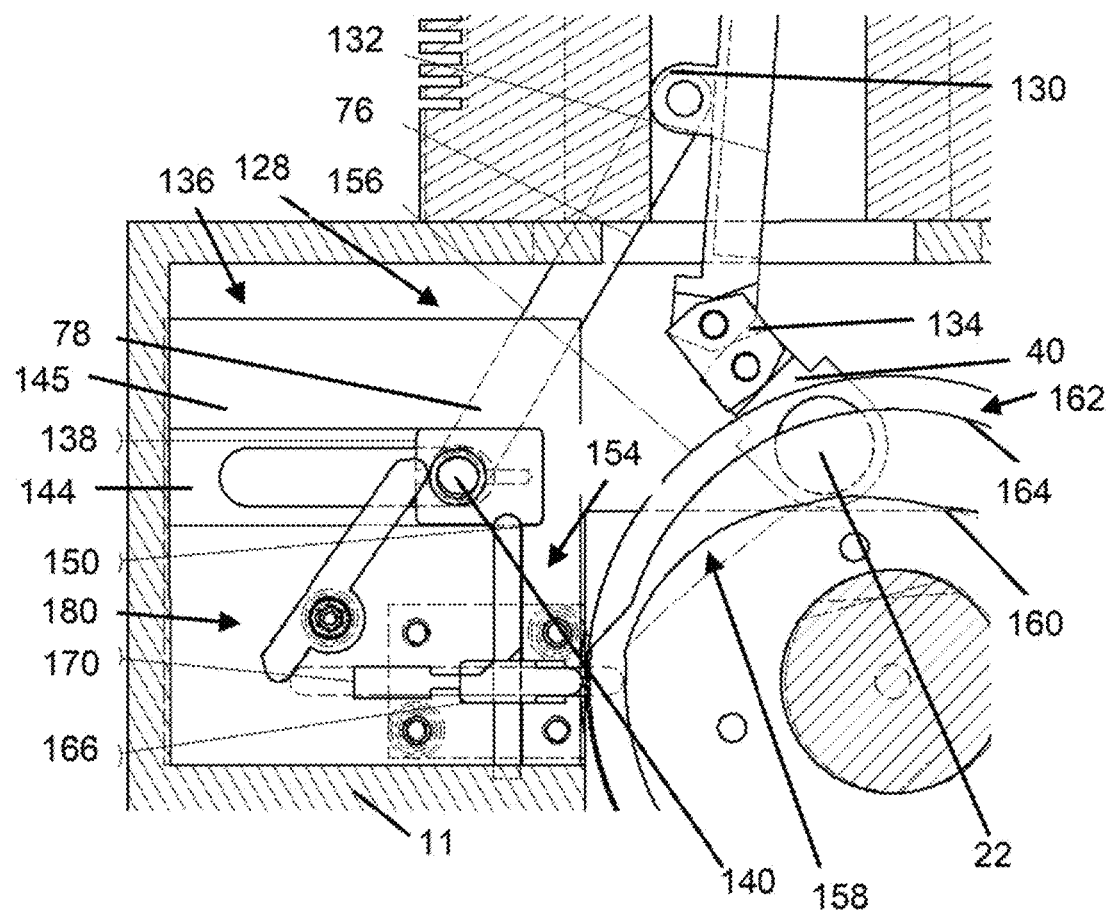
FIG. 17 is a schematic sectional view of the embodiment of FIG. 15A.

A moving pivot point mechanism 136 connects the pivot link first end 78 to the casing 11 (see FIG. 17). The moving pivot point mechanism 136 includes a movable mount 138, the pivot link first end 78 having a pivotal connection 140 with the movable mount 138. The movable mount 138 is shown as having a generally rectangular block body 142 (see also FIG. 16) for being received in and sliding in a correspondingly shaped guide path 144 of guide path device 145, the guide path 144 providing a defined path along which the movable mount 138 can travel. The body 142 includes a pivot bore 146 for receiving a shaft for the pivot 140 and a locking detent 148 for engaging a locking pin 150. The movable body also includes a bore 152 used for locking the pivot shaft to the moving pivot point. Although only one movable mount 138 can be used, in a preferred embodiment, two guide paths 144 are provided for supporting two movable mounts 138, one on each side of the casing 11, that is, on opposite sides of the pivot link 76, and the pivot 140 runs between the two pivot bores 146 with the pivot link positioned therebetween. This creates a strong connection because the shaft is supported at both ends and locks the shaft in place between the opposite sides of the casing 11.

A locking mechanism 154 connects with the movable mount 138 for locking the movable mount 138 in a locked position, as shown in FIG. 17. The locking mechanism 154 includes the locking pin 150 being driven by the crankshaft 156 and having locking portion 151 to engage the locking detent 148 of the movable mount 138 when the movable mount 138 is moved to the locked position to lock the movable mount 138 in the locked position. The locking pin 150 is also driven by the crankshaft to disengage from the locking detent 148 when the piston 16 is on a downstroke. Crankshaft 156 includes a first cam mechanism 158 for controlling motion of the movable mount 138, as will be discussed further below and a second cam mechanism 162 for controlling the locking mechanism. Although only one of each of the cam mechanisms 158 and 162 need be provided on the crankshaft, in the embodiment shown, one each of the cam mechanisms 158 and 162 is provided on each side of the crankpin 22 so that each mechanism can operate an individual locking/motion control mechanism positioned on respective sides of the crankpin 22. The cam mechanisms can be machined into the crankshaft or can be separate components attached to the crankshaft, either removably or permanently. A separate camshaft can also be provided, driven by the crankshaft.

Figure 19:
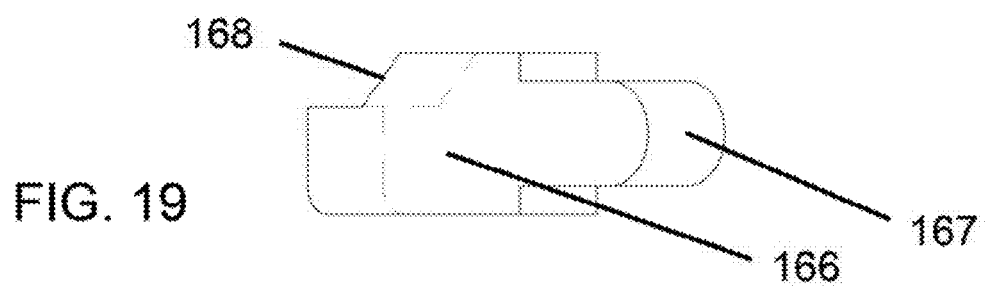
FIG. 19 is a perspective view of a cam follower of the embodiment of FIG. 15A.
Figure 20:
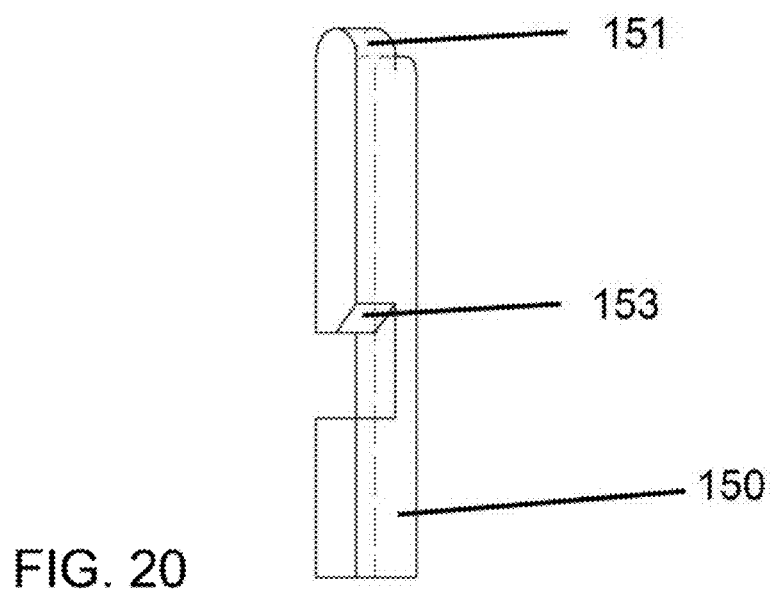
FIG. 20 is a perspective view of a locking pin of the embodiment of FIG. 15A.

The locking mechanism 154 further includes the second cam mechanism 162 driven by the crankshaft 156 and having a second cam path 164. A second cam follower 166 engages between the second cam path 164 and the locking pin 150. The second cam follower 166 (see also FIG. 19) includes a cam engaging surface 167 and a ramped driving surface 168. A spring 170 biases the second cam follower 166 in a direction toward the second cam path 164 and a spring can be used to bias the locking pin 150 in a direction away from the locking detent 148 when the locking pin 150 is not being driven into engagement with the locking detent 148 by the second cam follower 166. Alternatively, the spring can be omitted and the shape of the pin and follower configured to move the cam follower.

The locking pin 150 includes a driven surface 172 for engaging the second cam follower driving surface 168 such that movement of the second cam follower 166 in a locking direction causes the locking pin 150 to move toward engagement with the locking detent 148 of the movable mount 138 and movement of the second cam follower 166 away from the locking direction allows the locking pin 150 to move away from engagement with the locking detent 148 of the movable mount 138. When the locking pin 150 engages the locking detent 148, the movable mount 138 is prevented from moving from the locked position. When the locking pin 150 is disengaged from the locking detent 148, the movable mount 138 is allowed to move along the guide path 144, subject to control by a motion control mechanism 172.

The motion control mechanism 172 for controlling movement of the movable mount 138 includes the first cam mechanism 162 driven by the crankshaft 156 and having the first cam path 160. A motion control linkage 180 operatively connects between the first cam path 160 and the movable mount 138 to allow the first cam path 160 to control movement of the movable mount 138. The first cam path 160 includes a first portion constructed and arranged to allow the movable mount 138 to move along the guide path 144 in a direction away from the MLCR 126 on a first portion of an upstroke of the piston 16, where the movement of the connecting rod 132 and pivot link 76 drive the movable mount 138 away from the MLCR 126 and crankshaft 156.

The first cam path 160 also includes a second portion constructed and arranged to move the movable mount 138 along the guide path 144 in a direction toward the MLCR 126 and crankshaft 156 on a second portion of an upstroke of the piston 16 until reaching the locked position. On this second portion of the first cam path 160, the first cam path 160 can drive the motion control linkage 180 to drive the movable mount 138 toward the locked position. The motion control linkage 180 further includes a first cam follower engaging the first cam path, the first cam follower 182 including a driving surface 184. A rocker arm 186 is pivotally mounted to the casing 11 with pivot 188 and has a first end 190 connecting with the movable mount 138 and a second end 192 opposite the first end 190 connecting with the first cam follower driving surface 184. The rocker arm 186 thus transfers motion from the first cam path 160 and the first cam follower 182 to the movable mount 138. In an alternative embodiment, a biasing force to bias the movable mount 138 toward the locking position can be provided by a spring, hydraulically, by a solenoid or electric motor or by another mechanism.

Figure 18:
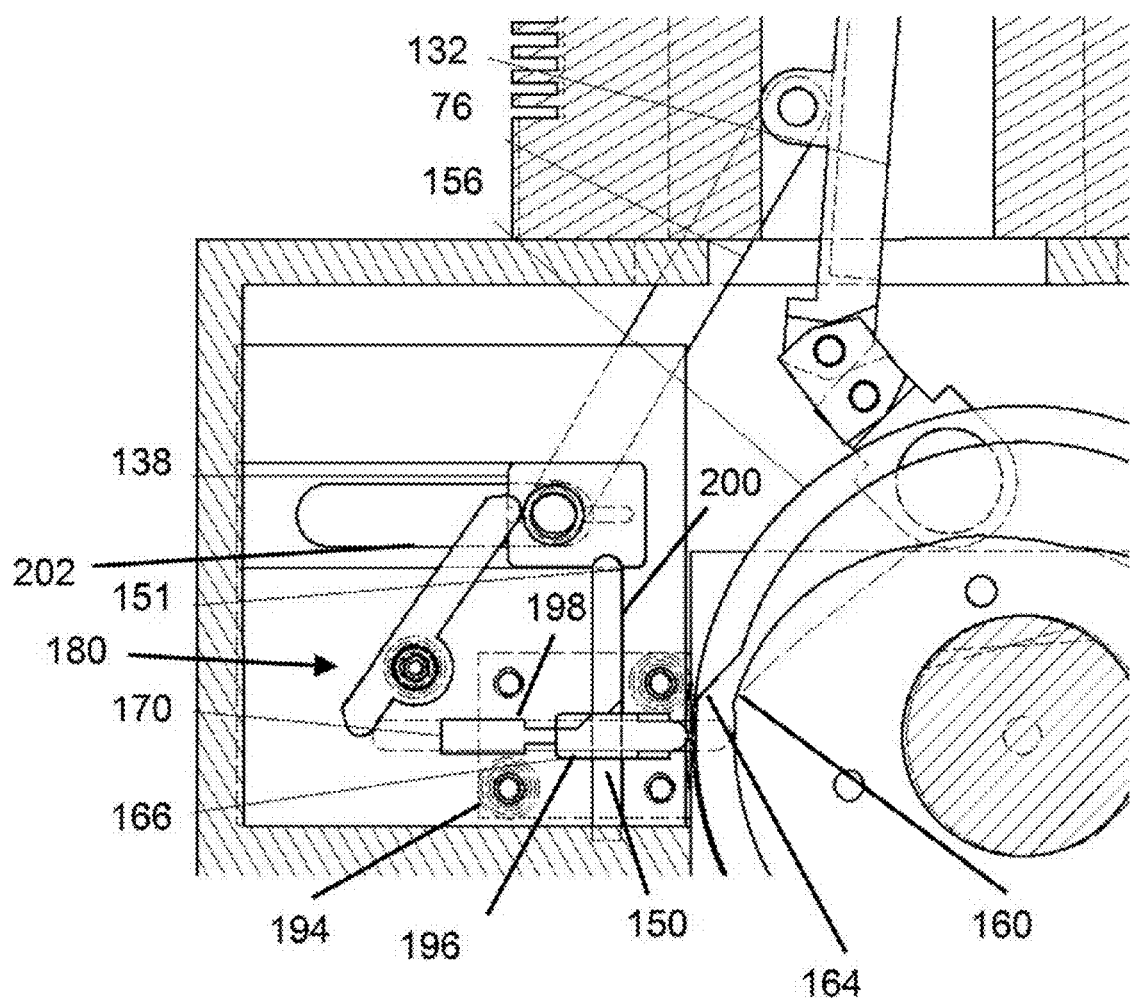
FIG. 18 is a schematic detail sectional view of the embodiment of FIG. 15A.
Figure 21:
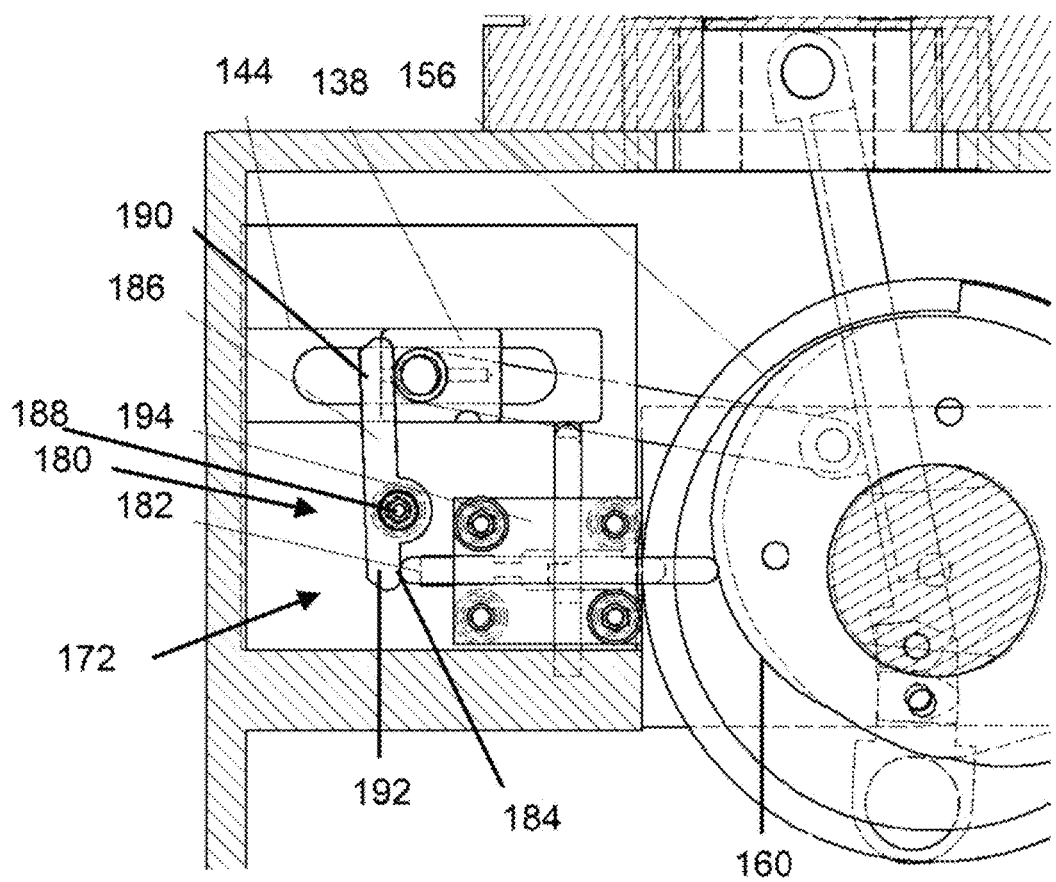
FIG. 21 is a schematic detail sectional view of the embodiment of FIG. 15A in a different position.

A cam follower housing 194 (see FIG. 18) is connected to the casing 11 and includes a first cam follower slot 196 slidably receiving the first cam follower 182, a second cam follower slot 198 slidably receiving the second cam follower 166 and a locking pin slot 200 slidably receiving the locking pin 150.

The guide path device guide path 144 includes a straight slot portion 202 slidably receiving the movable mount 138. In this embodiment, the first and second cam follower slots 196 and 198 are aligned radially with respect to an axis of the crankshaft 156 and the locking pin slot 200 is aligned normal to the second cam follower slot 198.

Figure 9:
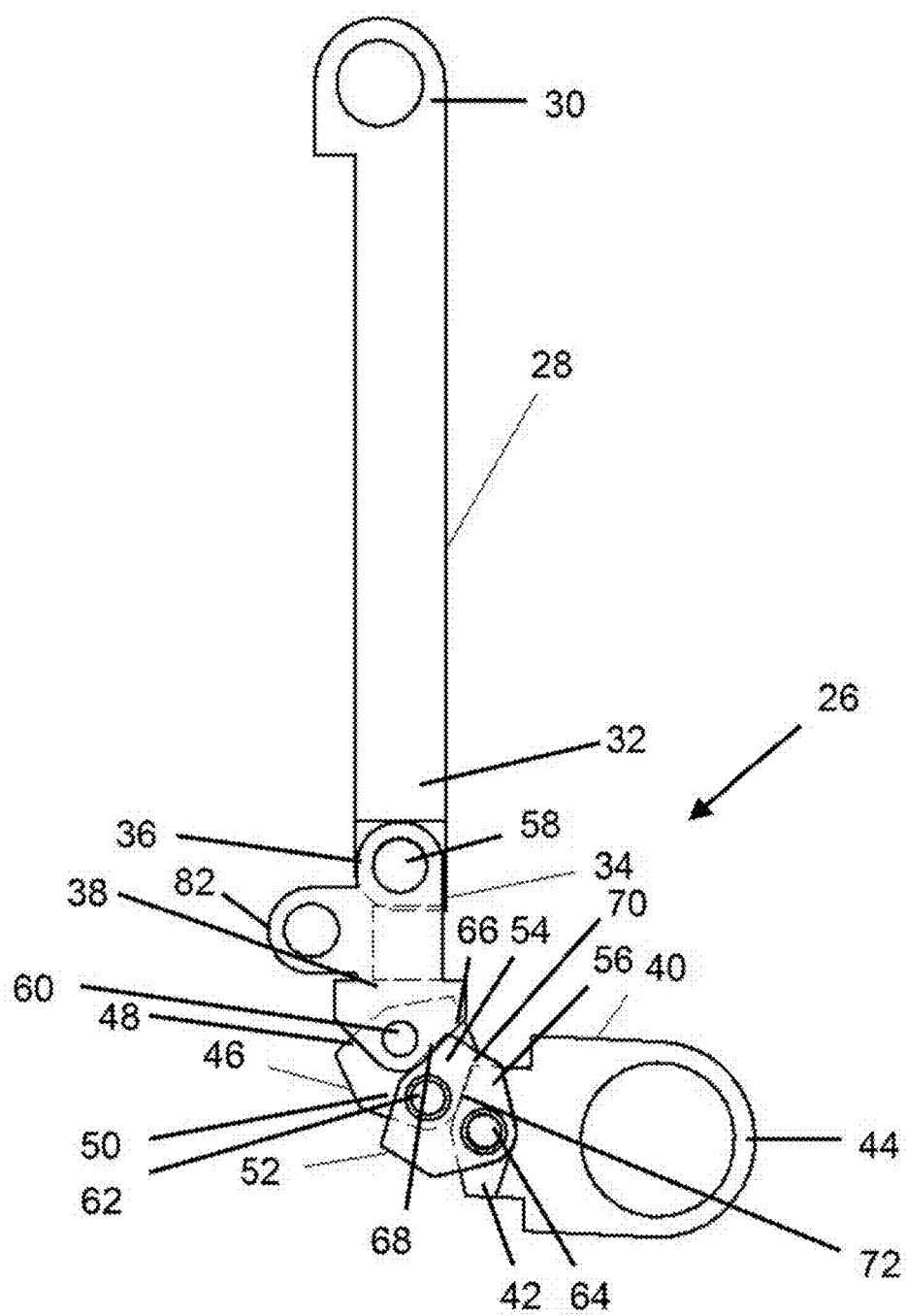
FIG. 9 is a schematic detail view of a multi-linkage connecting rod mechanism of the embodiment of FIG. 8.

This embodiment is similar to the fixed pivot point embodiment of FIGS. 8-10 but the pivot point 140 is on a sliding movable mount 138. The movable mount 138 slides out of the way of the MLCR 126 when pivot link 76 is horizontal as the crankshaft 156 rotates past 180 degrees. This eliminates the need for the third hinge link 52 and allows the hinge links of the MLCR 126 to rotate a smaller amount past center, where they lock into position at the bottom of the stroke.

Figure 22A:
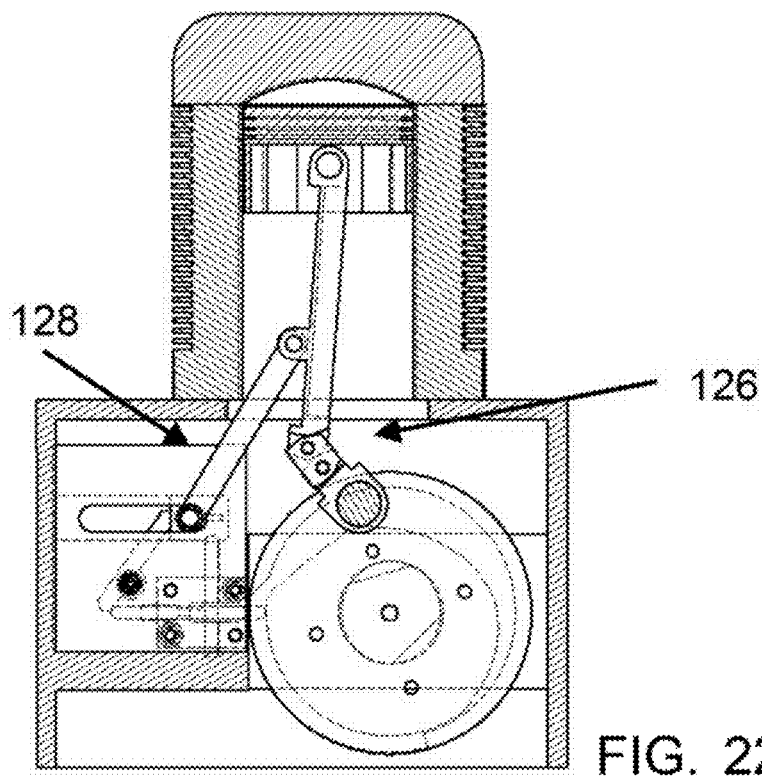
FIG. 22A shows a first position in a sequence of six positions for the engine of FIG. 15A as the engine rotates through a revolution.

FIGS. 22A-22F show a sequence of six positions for the engine 124 as the engine 124 rotates through a revolution, including the changing shape of the MLCR 126 during the down stroke, and the raising of the piston 16 and the resetting of the force transfer mechanism 128 and MLCR 126 during the up stroke. FIG. 22A shows the engine 124 with the piston 16 at TDC. TDC for the piston of this engine 124 starts before the crankpin 22 is at the top. By doing this, the crankshaft 156 can be rotated without the piston 16 dropping as much as with a conventional crank slider mechanism would for the same amount of crankshaft rotation. This change allows the piston peak power to be maintained for longer, which increases the overall power level generated by the same amount of fuel burned. This is true for all sliding pivot point alternatives (further embodiments are discussed below).

Figure 22B:
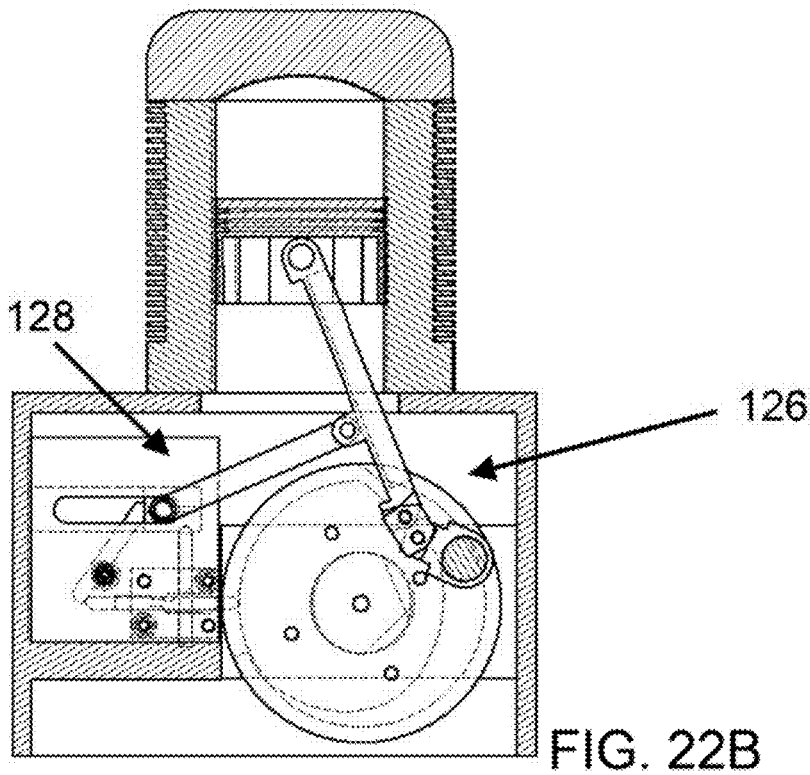
FIG. 22B shows a second position in the sequence of six positions for the engine of FIG. 15A as the engine rotates through a revolution.
Figure 22C:
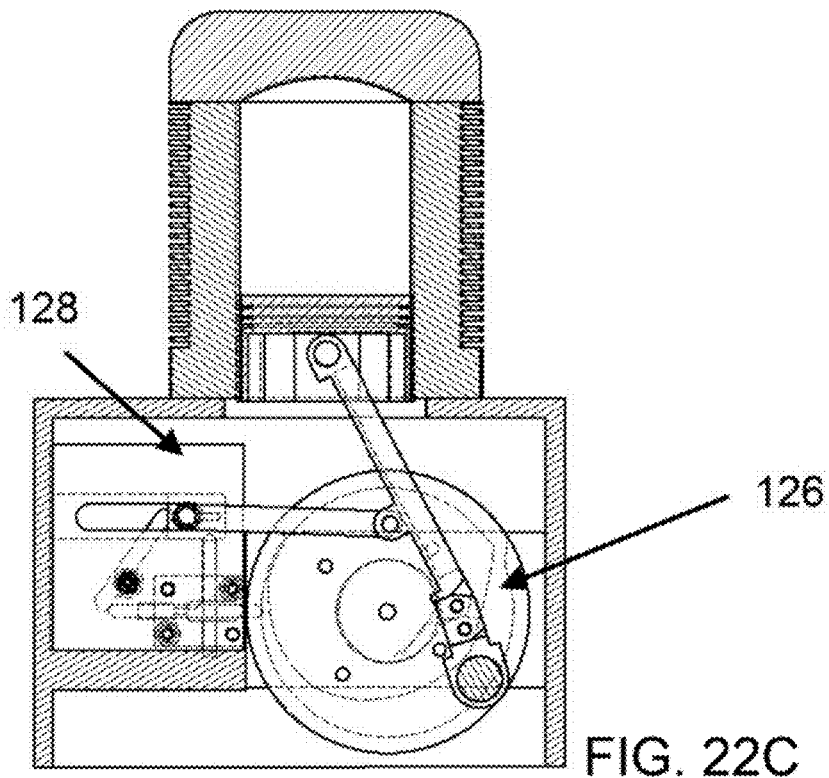
FIG. 22C shows a third position in the sequence of six positions for the engine of FIG. 15A as the engine rotates through a revolution.

FIGS. 22B and 22C show the down stroke and the changing shape of the MLCR 126. All of the moving pivot point alternatives are able to take advantage of the changing shape of the MLCR and that the MLCR bends substantially only in one direction to support crank strokes that are larger than the piston stroke. That is, the MLCR 126 can bend in a direction away from the force transfer mechanism, and return to a starting position, but the MLCR 126 does not substantially bend from a longitudinal axis of the connecting rod in a direction toward the force transfer mechanism. It may go over center in a direction toward the force transfer mechanism to a small amount but not to the same degree as in the other direction. It can also be limited to not bending beyond center in a direction toward the force transfer mechanism.

Figure 22D:
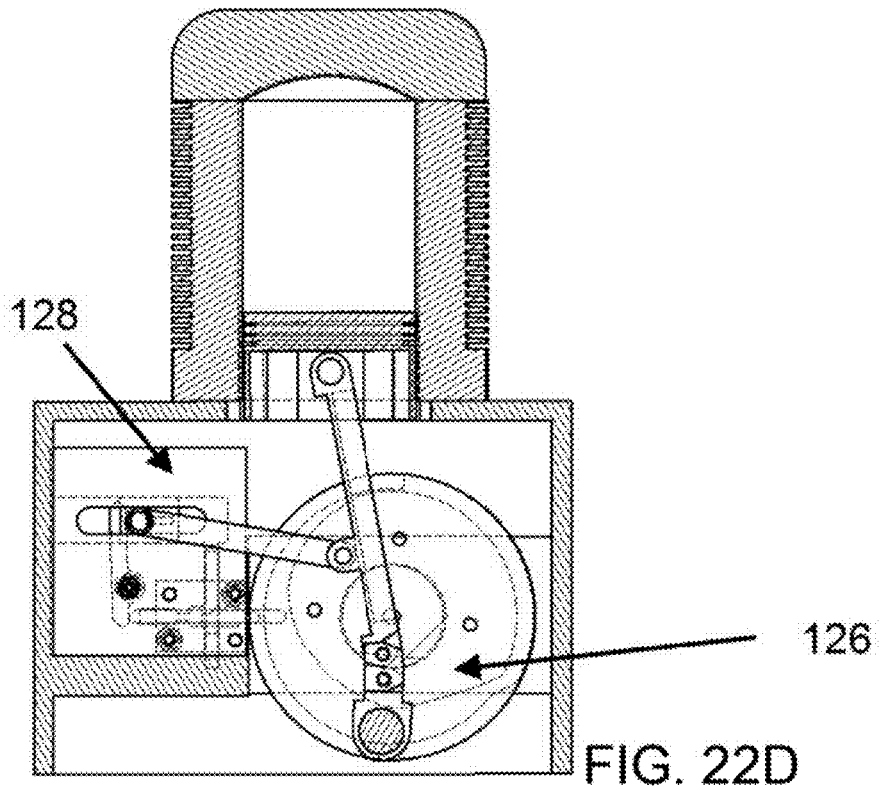
FIG. 22D shows a fourth position in the sequence of six positions for the engine of FIG. 15A as the engine rotates through a revolution.
Figure 22E:
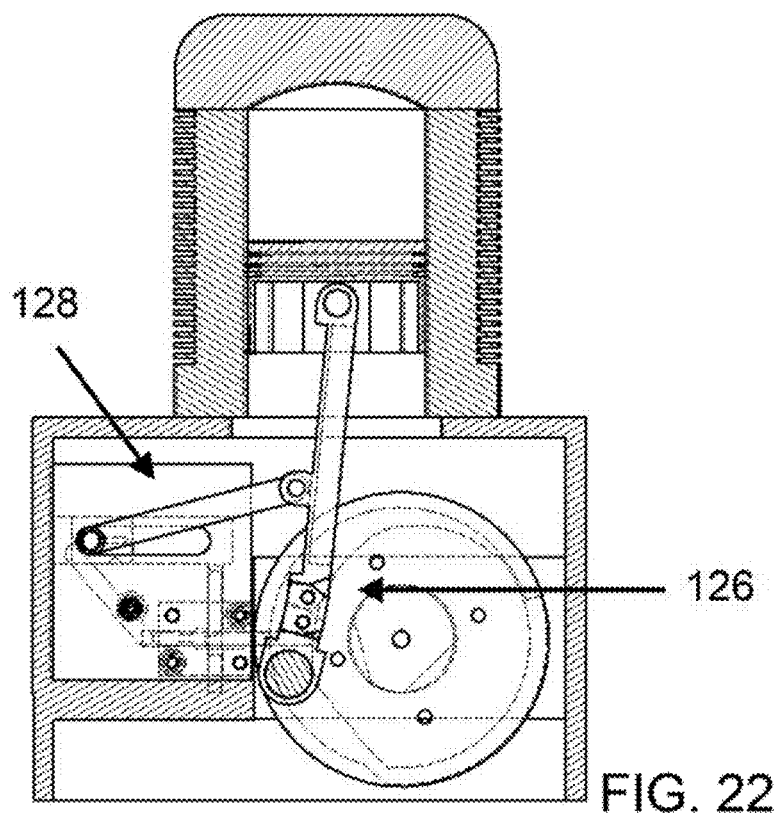
FIG. 22E shows a fifth position in the sequence of six positions for the engine of FIG. 15A as the engine rotates through a revolution.
Figure 22F:
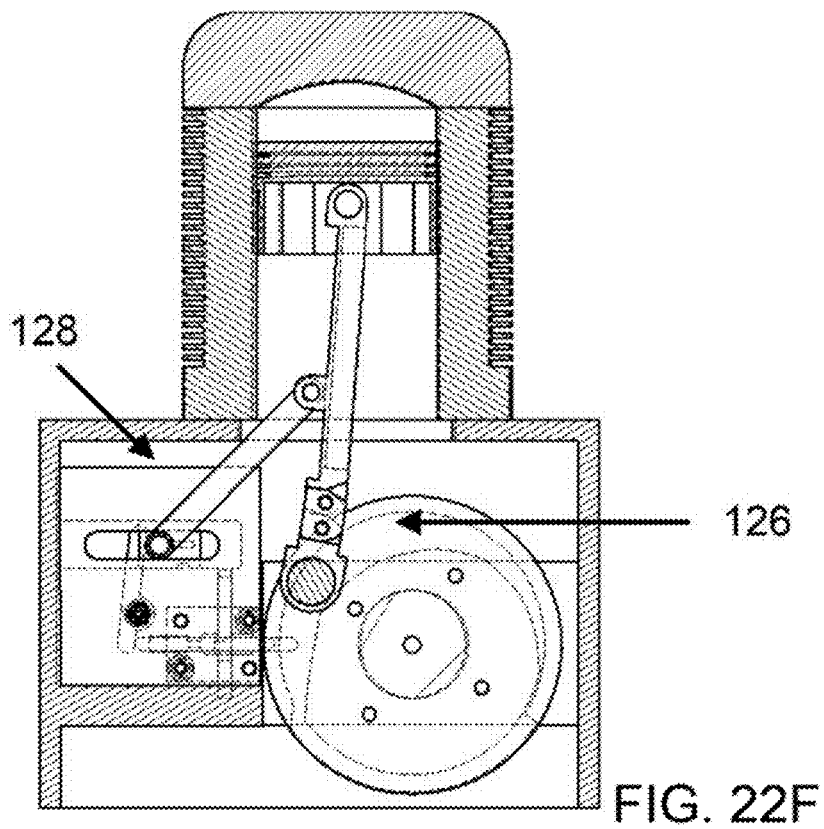
FIG. 22F shows a sixth position in the sequence of six positions for the engine of FIG. 15A as the engine rotates through a revolution.

By the position of FIG. 22C, almost all of the piston force has been harnessed to perform work. At this point in the stroke, the goal is to prepare for the next power stroke by lifting the piston 16 as the crankshaft 156 rotates past 180 degrees of rotation (FIGS. 22D and 22E). By the position of FIG. 22D, the moving pivot point mechanism 136 has been unlocked, allowing the pivot link 76 to slide out of the way of the MLCR 126 as the crankshaft 156 continues to rotate. This Figure shows the hinge links of the MLCR 126 as being locked, where the major thrust side stop faces have engaged one another, to prevent further bending in that direction and to allow the piston 16 to be raised. In this embodiment, it is preferred that bending toward the moving pivot point mechanism 136 be limited to essentially a straight or nearly straight MLCR with up to approximately 10° bending toward the moving pivot point mechanism allowed. In the position of FIG. 22F, the piston 16 continues to be raised and the moving pivot point mechanism 136 is being moved back to its starting position at TDC were it will be locked into place. After the moving pivot point mechanism is locked in place, the crankshaft 156 continues to rotate and the hinge links of the MLCR will bend to the other side, away from the moving pivot point mechanism 136 back to their starting position ready for the next power stroke. Between the positions of FIGS. 22F and 22A, the force transfer mechanism 128 and MLCR 126 interact to stop the upward motion of the piston 16 and to reverse its direction of movement for the down stroke.

Figures 23A, 23B:
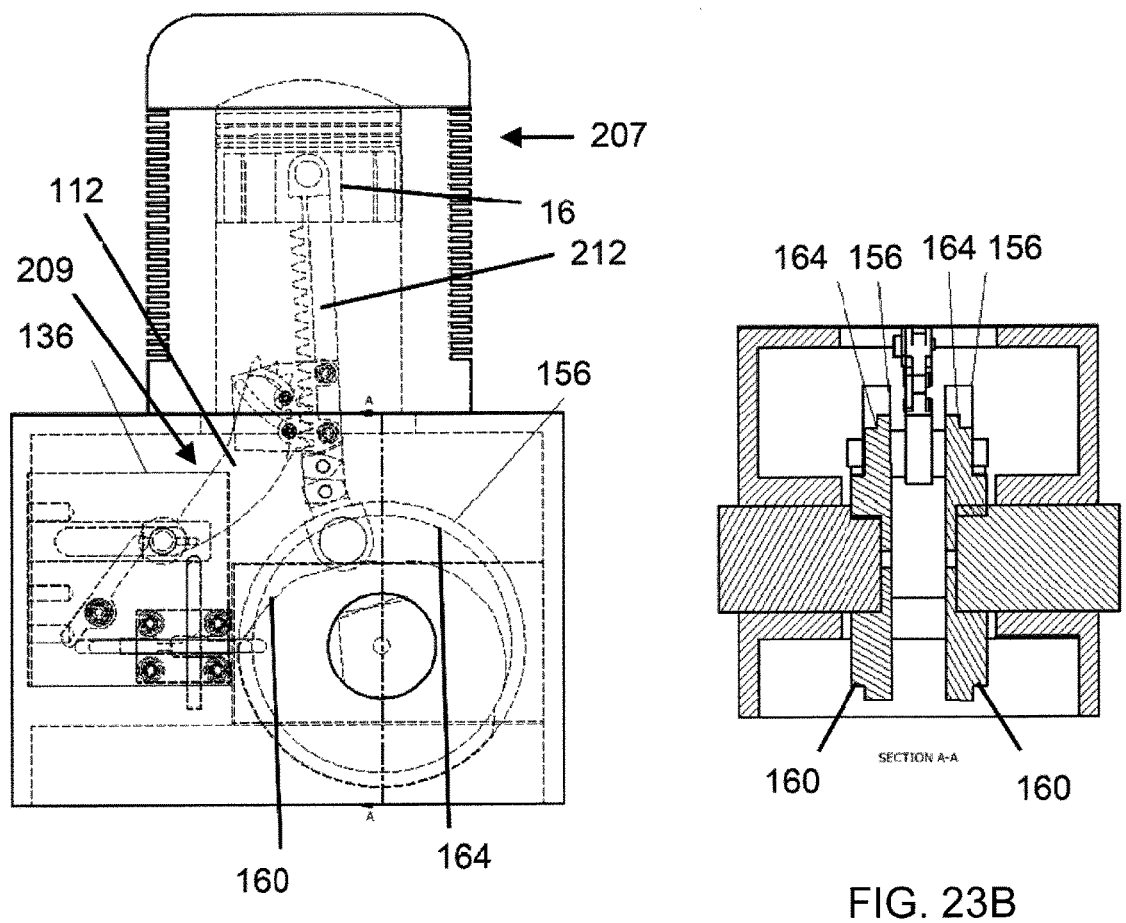
FIG. 23A is a schematic sectional view of an embodiment of the present invention.
FIG. 23B is a schematic sectional view of the embodiment of FIG. 23A taken along section line A-A.

FIG. 23 shows a variation of the embodiment of FIGS. 15-22, where the force transfer mechanism 209 is similar to the force transfer mechanism 74 of the embodiment of FIGS. 11-14. On this engine 207, the first gear portion 210 is positioned on the connecting rod 212 of the MLCR 208 (see FIG. 24), as opposed to being positioned on the first hinge link. As with the MLCR 126, the moving pivot point mechanism 136 allows the MLCR 208 to have only one connecting rod 212, hinge link 134 and crankpin link 40.

FIGS. 25A-25F show a sequence of six positions for the engine 207 as the engine 207 rotates through a revolution, including the changing shape of the MLCR 208 during the down stroke, and the raising of the piston 16 and the resetting of the force transfer mechanism 209 and MLCR 208 during the up stroke.

Figure 25A:
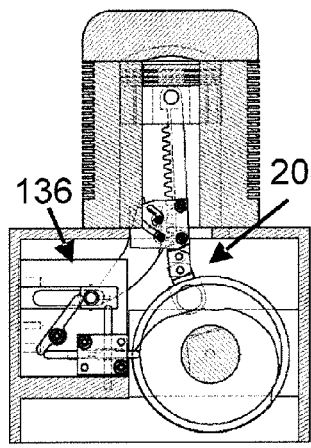
FIG. 25A shows a first position in a sequence of six positions for the engine of FIG. 23A as the engine rotates through a revolution.

FIG. 25A shows the engine 207 with the piston 16 at TDC. TDC for the piston of this engine 207 starts before the crankpin 22 is at the top. By doing this, the crankshaft 156 can be rotated without the piston 16 dropping as much as with a conventional crank slider mechanism would for the same amount of crankshaft rotation. This change allows the piston peak power to be maintained for longer, which increases the overall power level generated by the same amount of fuel burned. This is true for all sliding pivot point alternatives (further embodiments are discussed below).

Figure 25B:
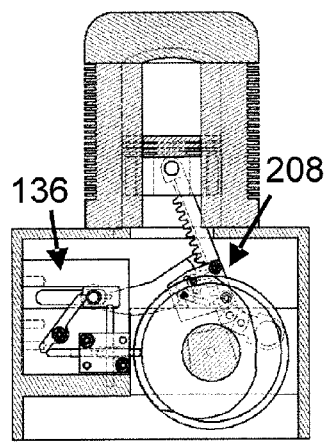
FIG. 25B shows a second position in the sequence of six positions for the engine of FIG. 23A as the engine rotates through a revolution.
Figure 25C:
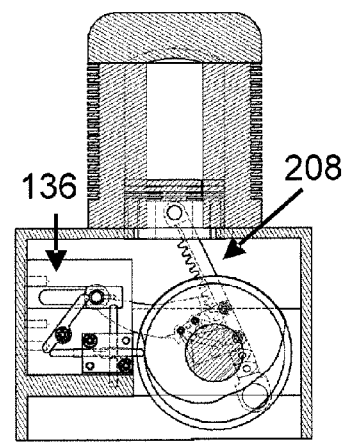
FIG. 25C shows a third position in the sequence of six positions for the engine of FIG. 23A as the engine rotates through a revolution.

FIGS. 25B and 25C show the down stroke and the changing shape of the MLCR 208. All of the sliding pivot point alternatives are able to take advantage of the changing shape of the MLCR and that the MLCR bends substantially only in one direction to support crank strokes that are larger than the piston stroke.

Figure 25D:
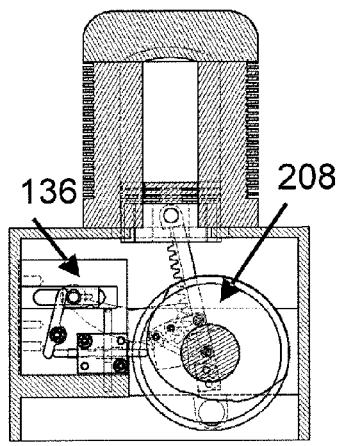
FIG. 25D shows a fourth position in the sequence of six positions for the engine of FIG. 23A as the engine rotates through a revolution.
Figure 25E:
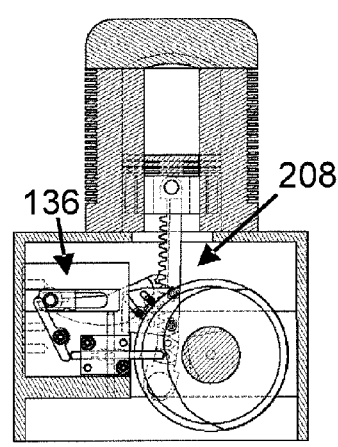
FIG. 25E shows a fifth position in the sequence of six positions for the engine of FIG. 23A as the engine rotates through a revolution.
Figure 25F:
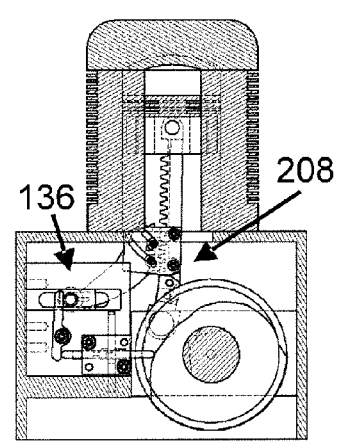
FIG. 25F shows a sixth position in the sequence of six positions for the engine of FIG. 23A as the engine rotates through a revolution.
Figure 27:
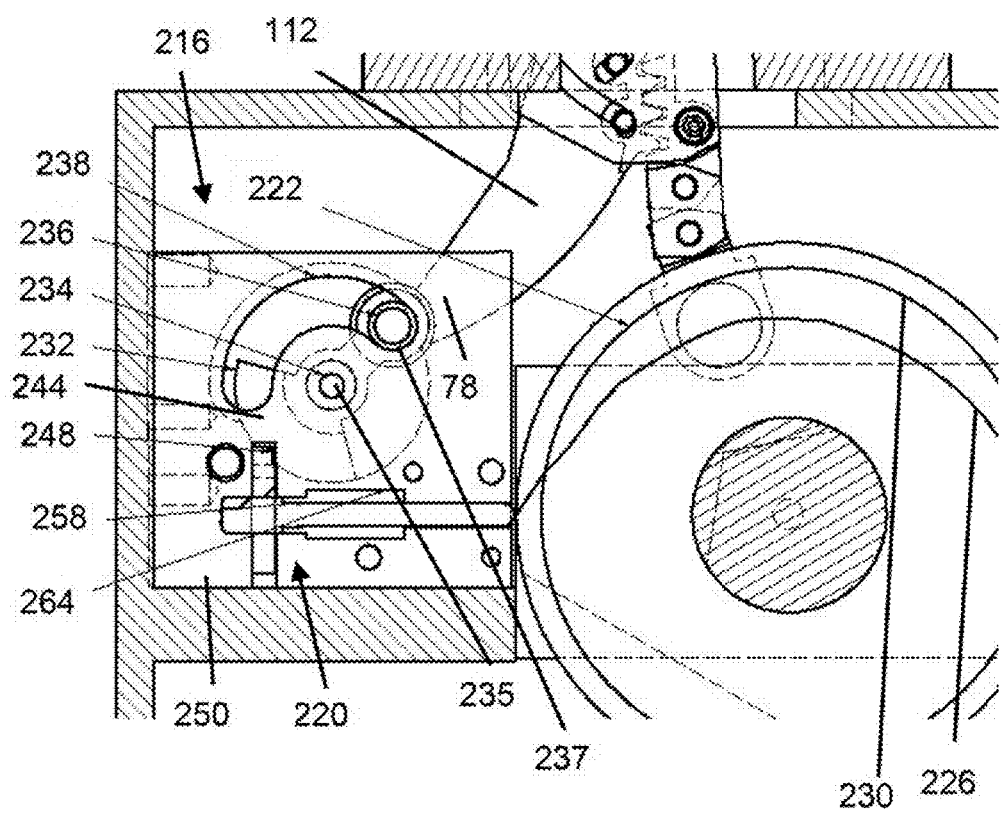
FIG. 27 is a schematic detail sectional view of the embodiment of FIG. 26A.

By the position of FIG. 25C, almost all of the piston force has been harnessed to perform work. At this point in the stroke, the goal is to prepare for the next power stroke by lifting the piston 16 as the crankshaft 156 rotates past 180 degrees of rotation (FIGS. 25D and 25E). By the position of FIG. 25D, the moving pivot point mechanism 136 has been unlocked, allowing the pivot link 112 to slide out of the way of the MLCR 208 as the crankshaft 156 continues to rotate. This Figure shows the hinge links of the MLCR 208 as being locked, where the major thrust side stop faces have engaged one another, to prevent further bending in that direction and to allow the piston 16 to be raised. In this embodiment, it is preferred that bending toward the moving pivot point mechanism 136 be limited to essentially a straight or nearly straight MLCR. In the position of FIG. 25F, the piston 16 continues to be raised and the moving pivot point mechanism 136 is being moved back to its starting position at TDC were it will be locked into place. After the moving pivot point mechanism is locked in place, the crankshaft 156 continues to rotate and the hinge links of the MLCR will bend to the other side, away from the moving pivot point mechanism 136 back to their starting position ready for the next power stroke. Between the positions of FIGS. 25F and 25A, the force transfer mechanism 209 and MLCR 208 interact to stop the upward motion of the piston 16 and to reverse its direction of movement for the down stroke.

Figure 24:
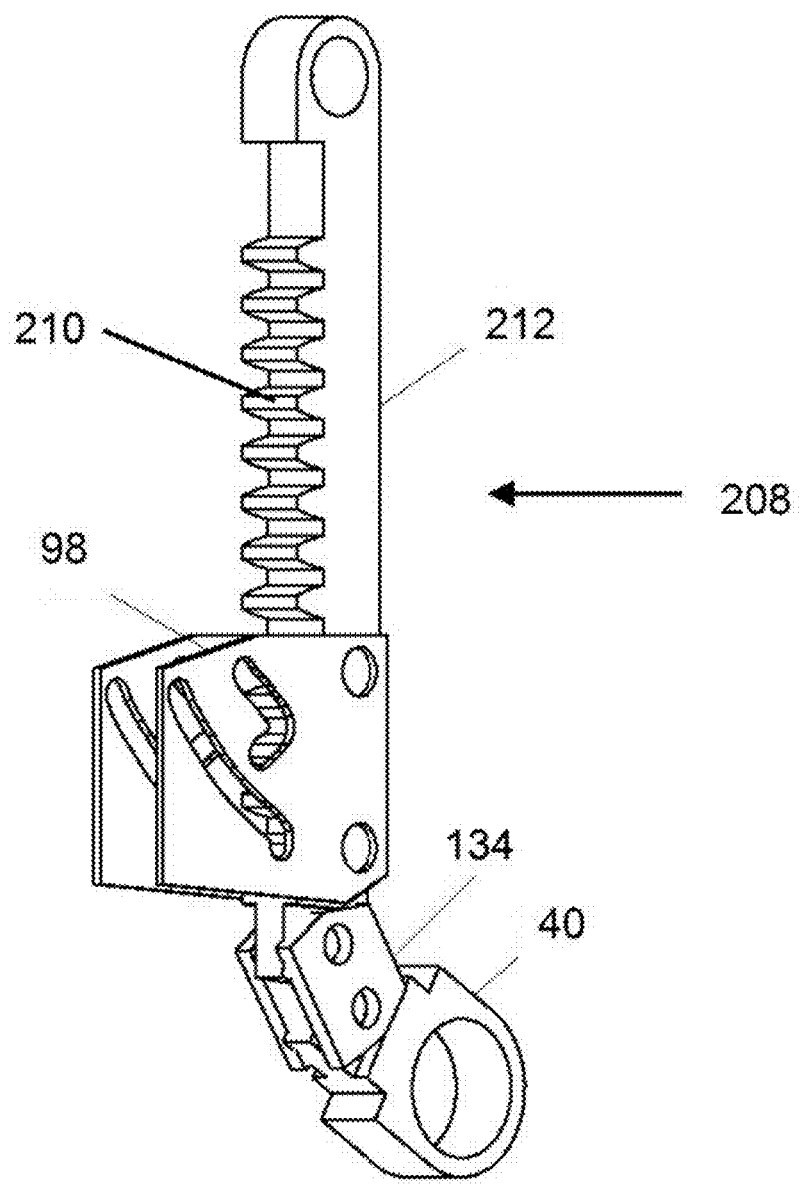
FIG. 24 is a perspective view of a multi-linkage connecting rod mechanism of the embodiment of FIG. 23A.

FIG. 26 shows a variation of the embodiment of FIGS. 23-25, using a different type of force transfer mechanism 215 including moving pivot point mechanism 216, motion control mechanism 218 and locking mechanism 220 and MLCR 208. On this engine 214, the moving pivot point mechanism 216 does not travel along a linear path as in the previous embodiment but travels along a semi-circular path. Crankshaft 222 includes a first cam mechanism 224 having a first cam path 226 and a second cam mechanism 228 having a second cam path 230. As with the embodiments above, while one each of the cam mechanisms and cam paths can be used, in a preferred embodiment, one each of the cam mechanisms and one each of the cam paths is used on each side of the crankpin 22 for strength.

The moving pivot point mechanism 216 includes a movable mount 232 having a pivotal connection 234 to the casing 11 to pivot about a movable mount axis 235 established by the pivotal connection 234. A pivoting pivot link connection 236 is connected to the pivot link first end 78, the pivot link connection 236 positioned radially outward of the movable mount axis 235 such that pivoting of the movable mount 232 about the movable mount axis 235 causes the pivot link connection 236 to move along an arcuate guide path 238. The pivot link connection 236 can directly engage the arcuate guide path 238. Alternatively, a guide element 237, such as a roller bearing or bushing, connected to the pivot link connection 236 can engage the arcuate guide path 238. Alternatively, there can be no engagement between the pivot link connection 236 and the arcuate guide path 238.

The movable mount 232 is shown as having a partial disc configuration (See FIG. 28) but can have a full disc or other configuration. It includes pivot bore 240 for the pivot link connection 236 and center bore 242 for the pivotal connection 234, the center bore 242 establishing the movable mount axis 235. A counterbalance portion 244 is positioned opposite the movable mount axis 235 from the pivot link connection 236. The movable mount 232 includes a locking surface 246 for engaging a locking pin 248. In this embodiment, the locking surface 246 is formed as a V-shaped notch or detent in an outer circumference of the counterbalance portion 244, but it can have alternative configurations and positions.

A moving pivot point housing 250 (see FIGS. 30 and 31) supports the movable mount 232 and other components of the moving pivot point mechanism 216, motion control mechanism 218 and locking mechanism 220. As seen in the first side view of FIG. 31, the moving pivot point housing 250 includes a recessed portion 252 for receiving the movable mount 232 and a boss portion 254 for providing the pivotal connection 234. The movable mount 232 can pivot directly on boss portion 254 via center bore 242 or a bearing or bushing can be interposed between the boss portion 254 and center bore 242. Alternative constructions can also be used including replacing boss portion 254 with a bore for receiving a pivot shaft to support the movable mount 232. The moving pivot point housing 250 also includes a second cam follower slot 256 for slidably receiving a second cam follower 258 and a locking pin slot 260 for slidably receiving a locking pin 262. See the second side view of the moving pivot point housing 250 in FIG. 30. A pocket portion 264 associated with the second cam follower slot is provided for a return spring to bias the second cam follower 258 toward the second cam mechanism 228. Alternatively, the spring can be omitted and the shape of the pin and follower configured to move the cam follower.

Figure 33:
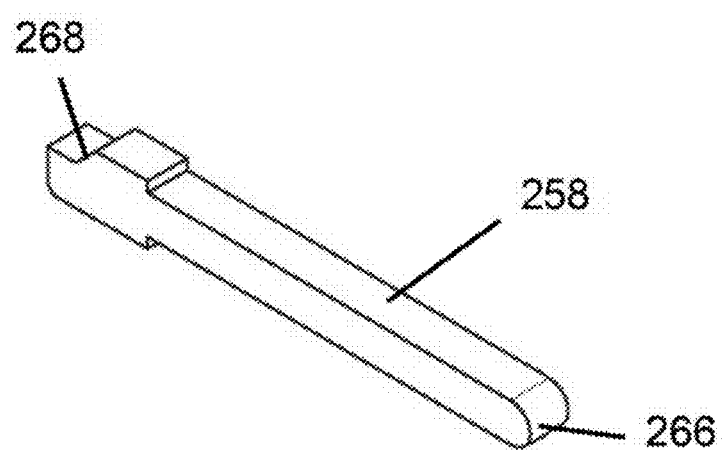
FIG. 33 is a perspective view of the second cam follower of the embodiment of FIG. 26A.

The locking mechanism 220 includes the second cam mechanism 228 driven by the crankshaft 222 and having the second cam path 230. The second cam follower 258 engages between the second cam path 230 and the locking pin 262. The second cam follower 258 (see also FIG. 33) includes a cam engaging surface 266 and a ramped driving surface 268. A spring can bias the second cam follower 258 in a direction toward the second cam path 230 and a spring can bias the locking pin 248 in a direction away from the locking detent 246 when the locking pin 248 is not being driven into engagement with the locking detent 246 by the second cam follower 258. Alternatively, the spring can be omitted and the shape of the pin and follower configured to move the cam follower.

Figure 32:
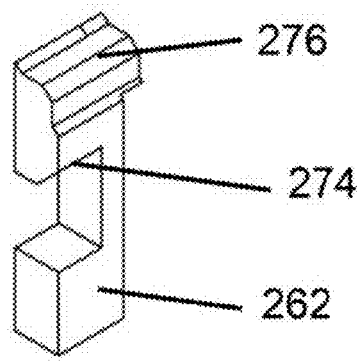
FIG. 32 is a perspective view of the locking pin of the embodiment of FIG. 26A.

The locking pin 262 (see FIG. 32) includes a driven surface 274 for engaging the second cam follower driving surface 268 such that movement of the second cam follower 258 in a locking direction causes the locking pin 262 to move toward engagement with the locking detent 246 of the movable mount 232 and movement of the second cam follower 258 away from the locking direction allows the locking pin 262 to move away from engagement with the locking detent 246 of the movable mount 232. Locking pin 262 also has engaging surface 276 for engaging the locking detent 246. When the locking pin 262 engages the locking detent 246, the movable mount 232 is prevented from moving from the locked position. When the locking pin 262 is disengaged from the locking detent 246, the pivot link connection 236 is allowed to move along the arcuate guide path 238, subject to control by the motion control mechanism 218.

Figure 34:
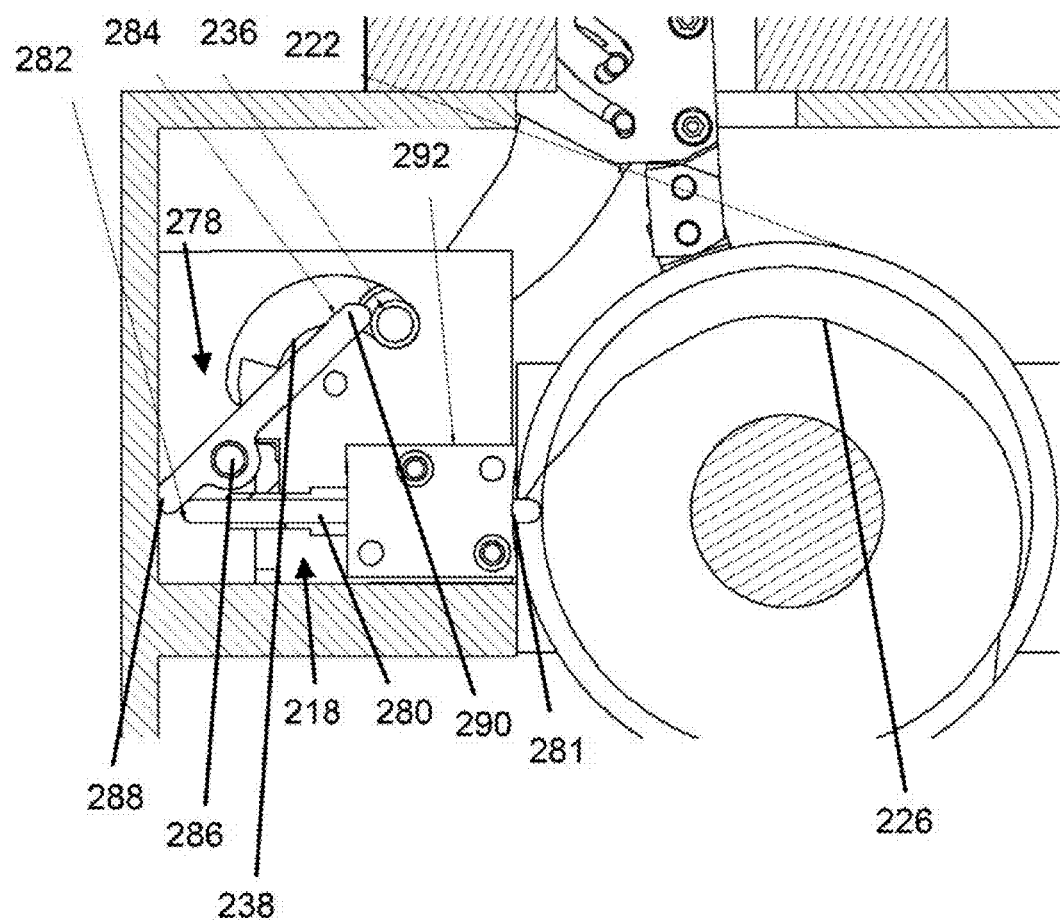
FIG. 34 is a schematic detail sectional view of the embodiment of FIG. 26A.

The motion control mechanism 218 for controlling movement of the movable mount 232 includes the first cam mechanism 224 driven by the crankshaft 222 and having the first cam path 226. See FIG. 34. A motion control linkage 278 operatively connects between the first cam path 226 and the movable mount 232 to allow the first cam path 226 to control movement of the movable mount 232. The first cam path 226 includes a first portion constructed and arranged to allow the pivot link connection 236 of movable mount 232 to move along the arcuate guide path 238 in a direction away from the MLCR 208 on a first portion of an upstroke of the piston 16, where the movement of the connecting rod 212 and pivot link 112 drive the pivot link connection 236 away from the MLCR 208 and crankshaft 222.

The first cam path 226 also includes a second portion constructed and arranged to move the pivot link connection 236 along the arcuate guide path 238 in a direction toward the MLCR 208 and crankshaft 222 on a second portion of an upstroke of the piston 16 until reaching the locked position. On this second portion of the first cam path 226, the first cam path 226 can drive the motion control linkage 278 to drive the pivot link connection 236 toward the locked position. The motion control linkage 278 further includes a first cam follower 280 engaging the first cam path 226, the first cam follower 280 including a driving surface 282. The first cam follower 280 is slidably positioned in a first cam follower slot 281 in one or both of the moving pivot point housing 250 or cam follower housing 292. A rocker arm 284 is pivotally mounted to the casing 11 with pivot mount 286 and has a first end 290 connecting with the pivot link connection 236 and a second end 288 opposite the first end 290 connecting with the first cam follower driving surface 282. The rocker arm 284 thus transfers motion from the first cam path 226 and the first cam follower 280 to the pivot link connection 236. In an alternative embodiment, a biasing force to bias the pivot link connection 236 toward the locking position can be provided by a spring, hydraulically, by a solenoid or electric motor or by another mechanism. A cam follower housing 292 is connected to the moving pivot point housing 250 to cover the first cam follower 280. In this embodiment, the first and second cam follower slots 281 and 256 are aligned radially with respect to an axis of the crankshaft 222 and the locking pin slot 260 is aligned normal to the second cam follower slot 256. The rocker arm first end 290 can engage the pivot link connection 236, the guide element 237, the movable mount 232, the pivot link 112 or other structure to control movement of the movable mount 232. The cam can also operate directly on the rocker arm, as the follower, or on the pivot mount.

The moving pivot point housing 250 can be a separate component attached to the casing 11, can be integrally provided with the casing 11 or a combination of both.

In one embodiment, generally duplicate, or mirror image, moving pivot point mechanisms are provided on each side of the crankpin with a first single shaft running therebetween to support the pivotal connection 234 and a second single shaft also running therebetween to support the pivot link connection. This provides a strong structure because the respective shafts are each supported at two separated ends.

This embodiment has the advantage of being easier to balance and requiring less space as compared to the linear movable mounts discussed above.

FIGS. 35A-35F show a sequence of six positions for the engine 214 as the engine 214 rotates through a revolution, including the changing shape of the MLCR 208 during the down stroke, and the raising of the piston 16 and the resetting of the force transfer mechanism 215 and MLCR 208 during the up stroke.

Figure 35A:
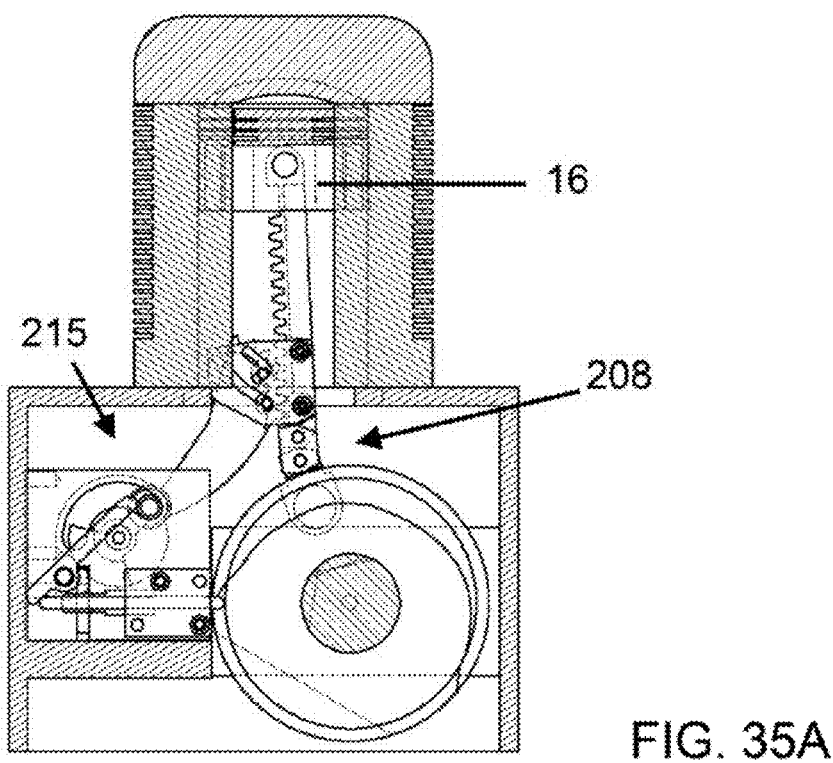
FIG. 35A shows a first position in a sequence of six positions for the engine of FIG. 26A as the engine rotates through a revolution.

FIG. 35A shows the engine 214 with the piston 16 at TDC. TDC for the piston of this engine 214 starts before the crankpin 22 is at the top. By doing this, the crankshaft 222 can be rotated without the piston 16 dropping as much as with a conventional crank slider mechanism would for the same amount of crankshaft rotation. This change allows the piston peak power to be maintained for longer, which increases the overall power level generated by the same amount of fuel burned.

Figure 35B:
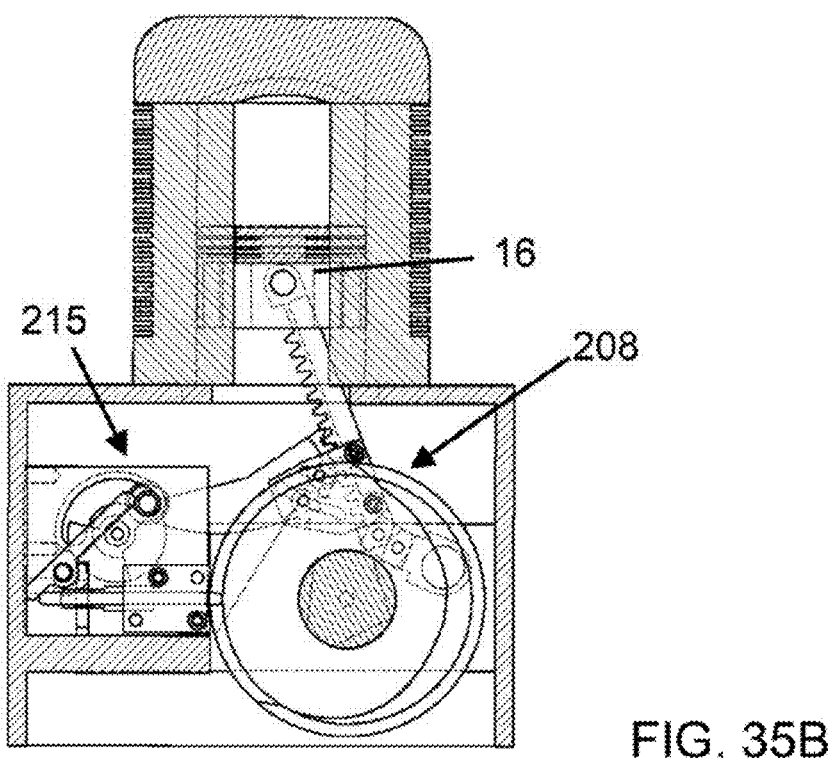
FIG. 35B shows a second position in the sequence of six positions for the engine of FIG. 26A as the engine rotates through a revolution.
Figure 35C:
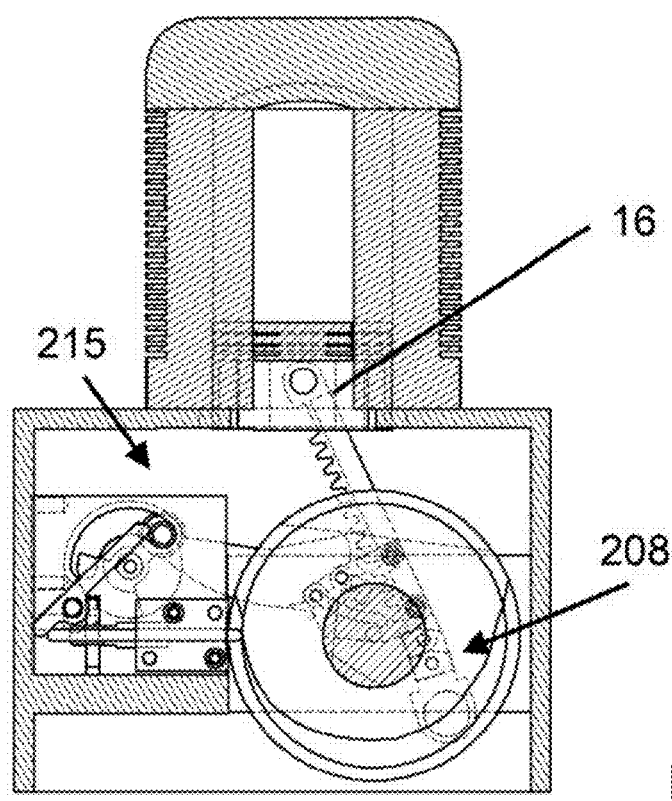
FIG. 35C shows a third position in the sequence of six positions for the engine of FIG. 26A as the engine rotates through a revolution.

FIGS. 35B and 35C show the down stroke and the changing shape of the MLCR 208. All of the sliding pivot point alternatives are able to take advantage of the changing shape of the MLCR and that the MLCR bends substantially only in one direction to support crank strokes that are larger than the piston stroke.

Figure 35D:
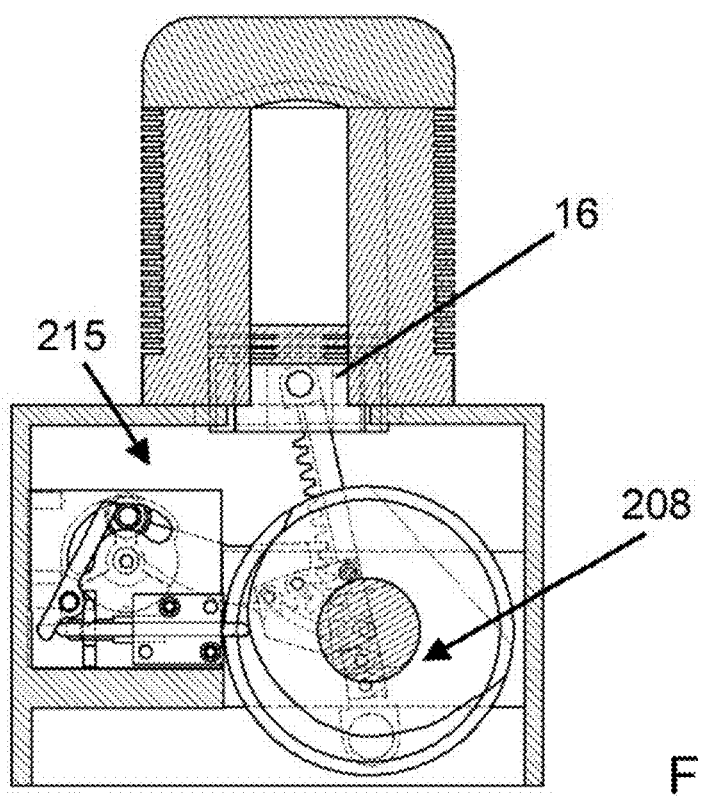
FIG. 35D shows a fourth position in the sequence of six positions for the engine of FIG. 26A as the engine rotates through a revolution.
Figure 35E:
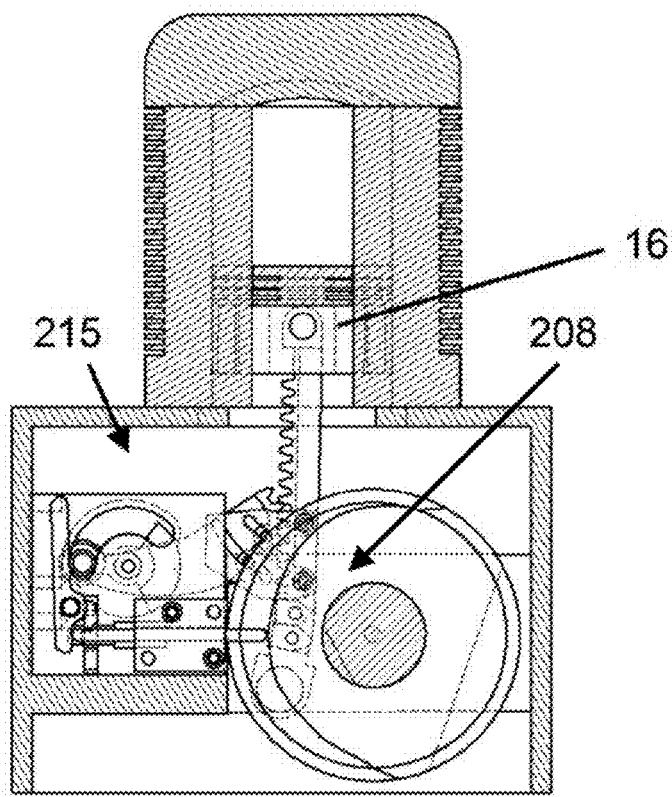
FIG. 35E shows a fifth position in the sequence of six positions for the engine of FIG. 26A as the engine rotates through a revolution.
Figure 35F:
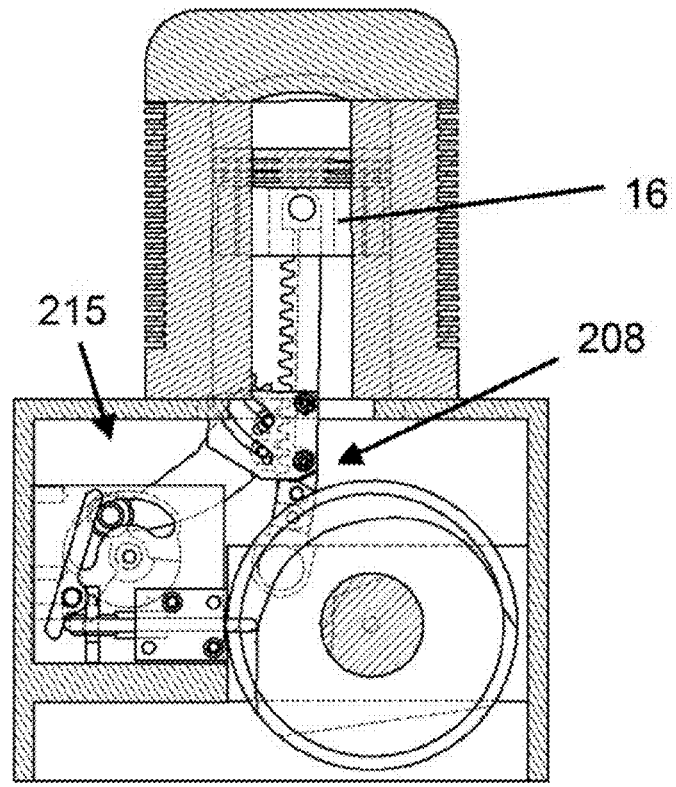
FIG. 35F shows a sixth position in the sequence of six positions for the engine of FIG. 26A as the engine rotates through a revolution.

By the position of FIG. 35C, almost all of the piston force has been harnessed to perform work. At this point in the stroke, the goal is to prepare for the next power stroke by lifting the piston 16 as the crankshaft 222 rotates past 180 degrees of rotation (FIGS. 35D and 35E). By the position of FIG. 35D, the moving pivot point mechanism 216 has been unlocked, allowing the pivot link 112 to slide out of the way of the MLCR 208 as the crankshaft 222 continues to rotate. FIG. 35D shows the hinge links of the MLCR 208 as being locked, where the major thrust side stop faces have engaged one another, to prevent further bending in that direction and to allow the piston 16 to be raised. In this embodiment, it is preferred that bending toward the moving pivot point mechanism 216 be limited to essentially a straight or nearly straight MLCR. In the position of FIG. 35F, the piston 16 continues to be raised and the moving pivot point mechanism 216 is being moved back to its starting position at TDC were it will be locked into place. After the moving pivot point mechanism 216 is locked in place, the crankshaft 222 continues to rotate and the hinge links of the MLCR will bend to the other side, away from the moving pivot point mechanism 216 back to their starting position ready for the next power stroke. Between the positions of FIGS. 35F and 35A, the force transfer mechanism 215 and MLCR 208 interact to stop the upward motion of the piston 16 and to reverse its direction of movement for the down stroke.

While the embodiments described herein having moving pivot point mechanisms are shown having locking mechanisms, it is also contemplated that the locking mechanisms can be omitted with locking control provided by the motion control the moving pivot point in the locked position. In such embodiments where the locking mechanism is omitted, the motion control mechanism can be made stronger to provide the necessary locking force.

The embodiments shown herein with a moving pivot are shown using linear or arcuate/circular movement. However, the moving pivot need not be so limited and can use any type of movement and mechanism to move out of the way of the MLCR.

Figure 36:
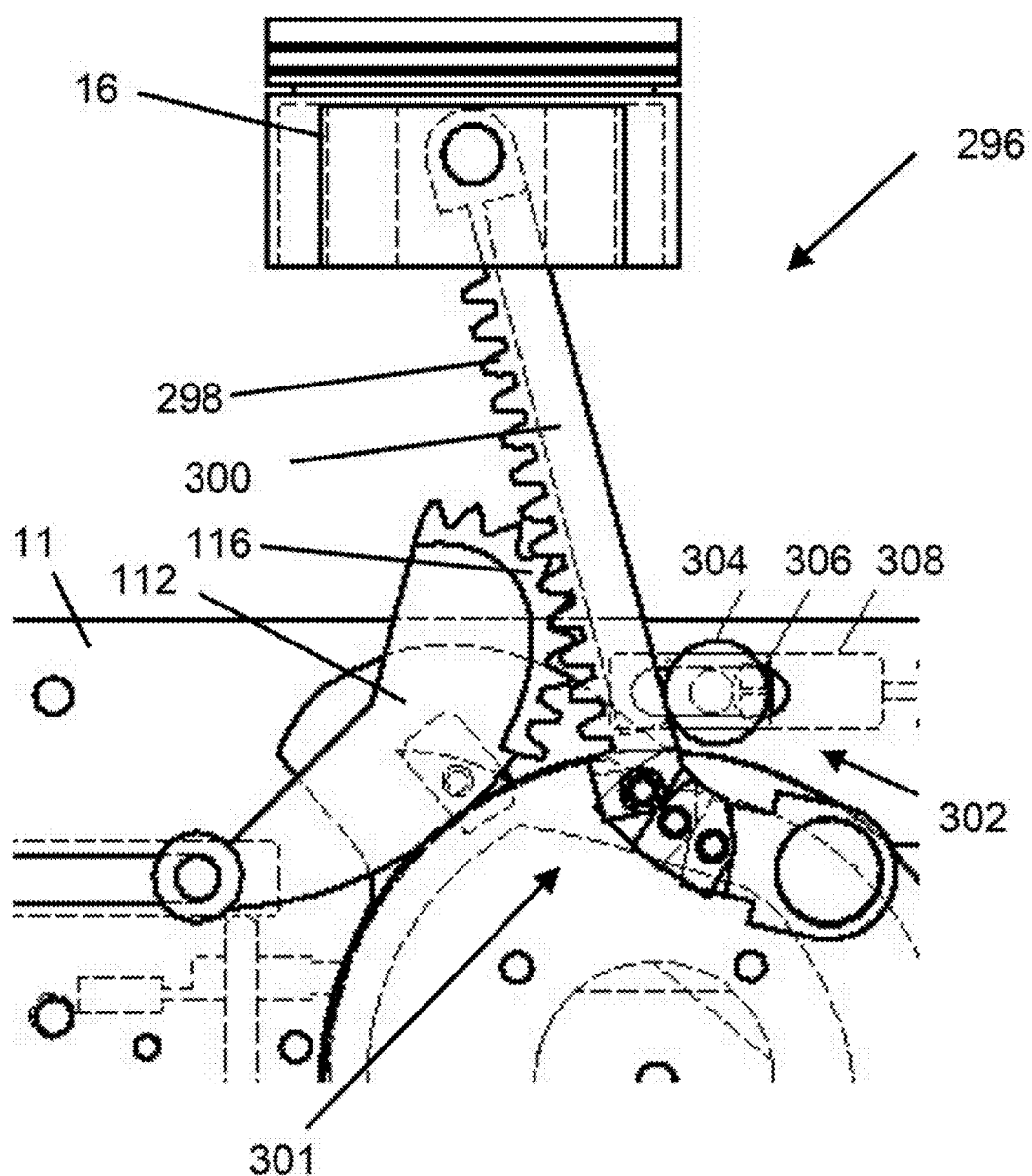
FIG. 36 is a schematic sectional view of an embodiment of the present invention.
Figure 37:
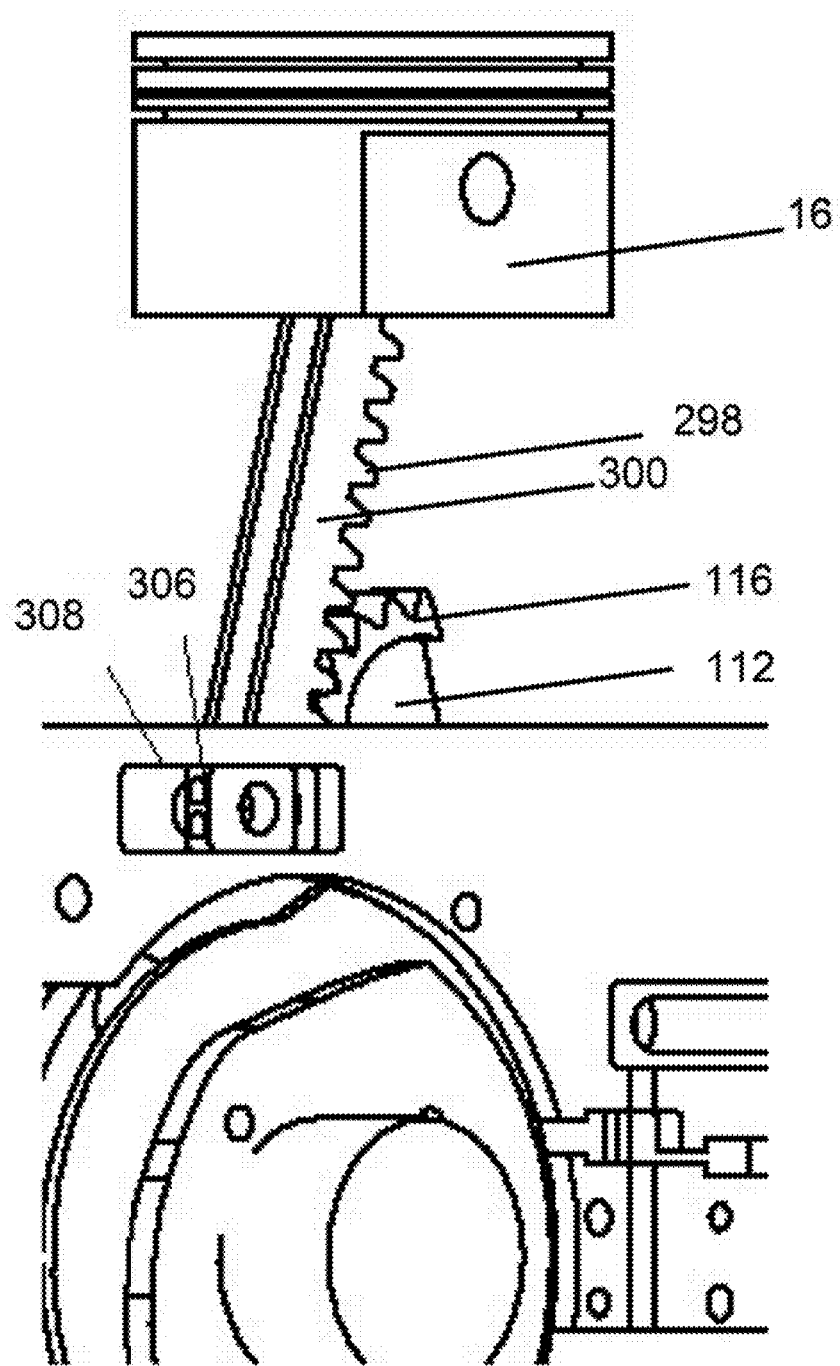
FIG. 37 is a schematic sectional perspective view of the embodiment of FIG. 36 from a reverse side.

FIGS. 36 and 37 show a variation of the embodiment of FIGS. 23-25. In this variation, engine 296 uses a different retention mechanism for maintaining the first gear mechanism. That is, the motion control mechanism prevents substantive movement of portion 298 of connecting rod 300 of MLCR 301 in meshing engagement with the second gear portion 116 of pivot link 112. Retention mechanism 302 includes an idler roller 304 rotatably mounted on a slider 306. Slider 306 is slidably positioned in a slider slot 308 connected to the casing 11. The slider slot 308 may be integrally provided as part of the casing 11 or can be a separate component attached to the casing 11. The slider can slide along a linear path as shown or can move along a different path. The slider can also have a different configuration and need not actually side in its motion. Rather, it could rotate or have another type of movement. The idler roller 304 is biased against a side of the connecting rod 300 to maintain the first gear portion 298 in meshing engagement with the second gear portion 116. As the connecting rod 300 moves up and down and back and forth, the sliding action of the slider maintains the idler roller in engagement with the connecting rod 300. The idler roller 304 can be biased directly or via biasing the slider 306. The biasing can be provided by a spring, hydraulically, by a solenoid or electric motor or by another mechanism. The biasing element can be provided in the slider slot 308 or external to the slider slot 308. Alternatively, the idler roller 304 can be mounted on a pivot arm attached to the casing 11 and the pivoting of the arm can maintain the idler roller in contact with the connecting rod 300. The pivot link 112 can also be biased into engagement with the connecting rod 300 by a spring, hydraulically or otherwise to assist in maintaining the first gear portion 298 in meshing engagement with the second gear portion 116.

Figure 38:
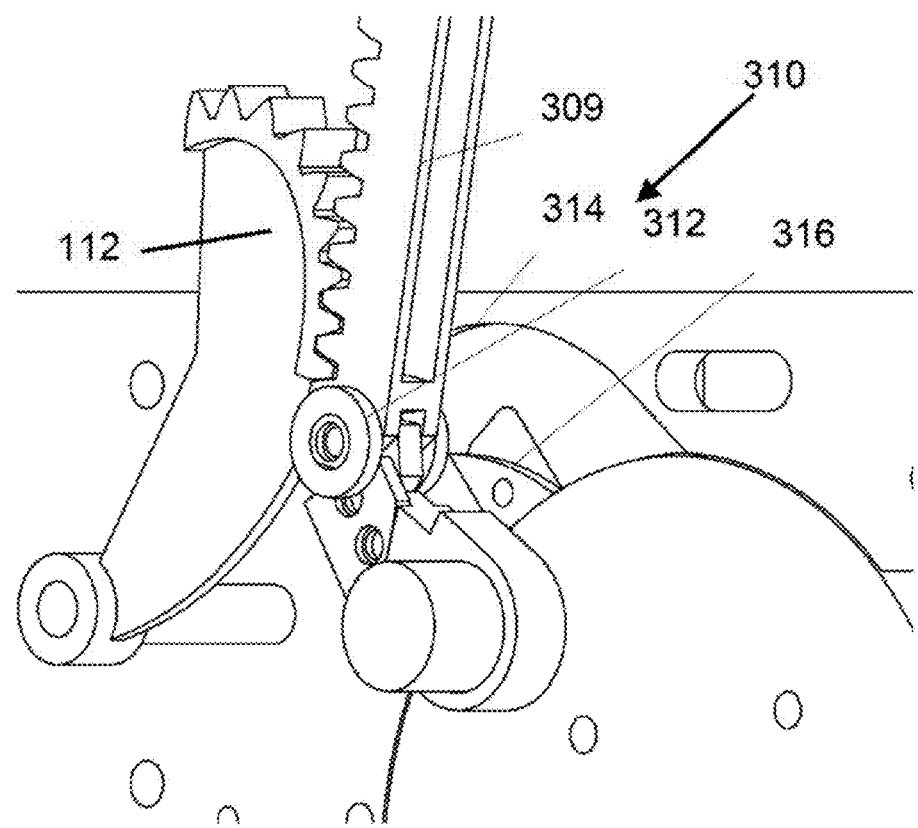
FIG. 38 is a schematic sectional perspective view of an embodiment of the present invention.
Figure 39:
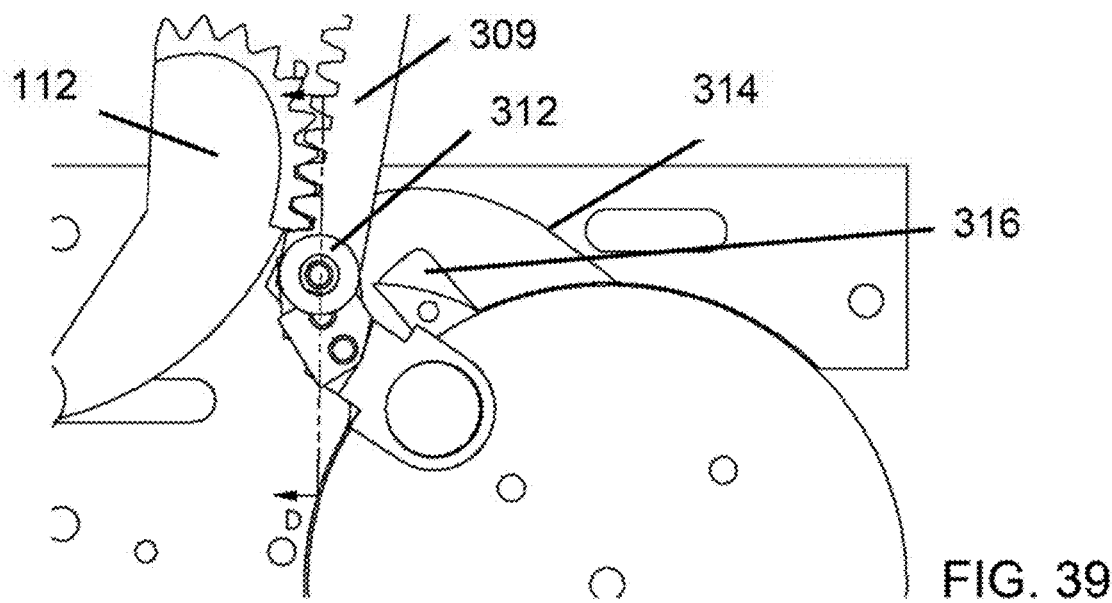
FIG. 39 is a schematic sectional view of the embodiment of FIG. 38.
Figure 40:
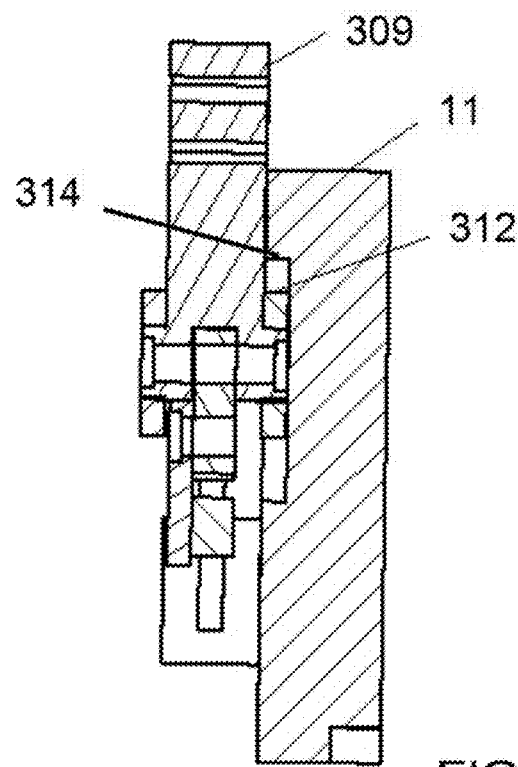
FIG. 40 is a sectional view along line DD in FIG. 39.

This variation can also further include a piston control mechanism 310 which prevents the piston 16 from traveling above a designed piston TDC. See FIGS. 38-40. The piston control mechanism 310 includes a control button 312 attached to the connecting rod 309 for engaging a control recess 314 connected to the casing 11. The engagement between the control button 312 and the control recess 314 defines a path of travel of the control button 312, and thus the connecting rod 309, at least on an upstroke of the piston 16 and connecting rod 309. That is, the control recess 314 defines an outer path that the control button 312 can travel when engaged in the control recess 314 and the control recess 314 can be configured to limit the upward travel of the piston 16 as it approaches TDC to prevent over-excursion of the piston 16. The piston control mechanism 310 can also include a control island 316 positioned in control recess 314. The control island 316 can interact with the control button 312 to change an angle of the hinge links of the MLCR as it is raised, bending the hinge links into position for the next power stroke. The control button 312 can be fixed with respect to the connecting rod 309, or can also be in the form of a roller such that it can roll as it travels along the control recess 314.

As with other components discussed herein, the piston control mechanism 310 can be provided as a single unit, but it is preferable in certain situations to provide one each of the mechanisms 310 on opposite sides of the crankpin 22 to provide strength and support.

The various embodiments discussed above provide engine performance gains when compared to conventional crank slider mechanisms. There are generally three aspects of the performance gains: torque generated, efficiency of harnessing the piston force to do work, and time spent close to TDC during the compression stroke.

The torque generated during the power stroke for the Invention is larger than that of a crank slider mechanism given the same piston force and efficiency of harnessing this force to do work. This is because an engine as disclosed herein will have a larger crank than a comparative crank slider mechanism for the same drop in piston length from TDC to BDC. How much larger depends on many factors, including the geometry of the connecting rod and connecting rod gear. However, a typical figure would be ~3 to 10% larger, which translates directly into more torque for the present engine as compared to a crank slider mechanism.

Figure 41:
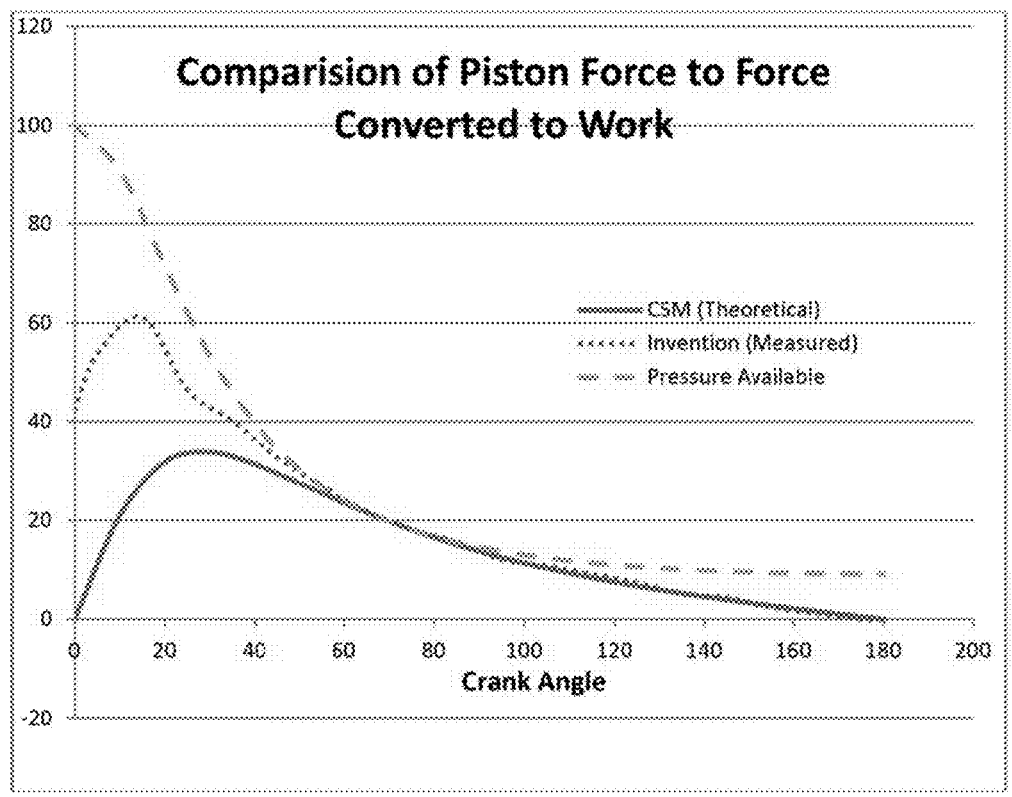
FIG. 41 is a graph showing a comparison of piston force versus force converted to work.

The efficiency of power transfer of the present engine depends on which alternative is used. The sliding pivot point non-circular gear alternatives are the most efficient and are used for the performance analysis in this section. For the non-circular gear alternatives, the efficiency depends on many parameters including the number of links in the variable geometry connecting rod, the major and minor radius of the connecting rod gear, offset of the pivot hole in the connecting rod gear, tooth profile of the connecting rod gear, initial angle of the connecting rod gear, placement of the connecting rod gear, and offset of the connecting rod compared to the crank center. FIG. 41 shows a measured efficiency of a prototype sliding pivot point non-circular gear alternative as compared against a theoretical crank slider mechanism with a 4 inch stroke and a connecting rod 6 inches in length. This figure is the same as FIG. 5 above, with the addition of the efficiency curve of the present engine. In FIG. 41, the "Pressure Available" curve is derived from the ideal gas law with temperature constant and 100 being the force available at TDC. The pressure available drops as the crank rotates and the volume of the combustion chamber expands. The "CSM curve" is derived from multiplying the crank slider mechanism percentage of force converted to work times the force available. The "Invention curve" is derived from multiplying the present engine percentage of force converted to work times the force available. This figure shows that the present engine is much more efficient that than the crank slider mechanism from TDC until the crank has rotated 60 degrees past TDC, where the piston force is 25% of its peak pressure. From 60 degrees onward the invention and crank slider mechanism have essentially equal efficiency.

For the sliding pivot point alternatives, during 360 degrees of crank rotation, the piston spends more time close to TDC during the compression stroke as compared to the fixed pivot point alternatives or a crank slider mechanism. The more time spent close to TDC during the compression stroke allows more time for the fuel mixture to burn. This allows the fuel mixture to reach a higher temperature earlier in the combustion process which increases the pressure peak as the volume is smallest in the early phases of the power stroke.

When these three advantages are looked at in totality, a significant gain of approximately 50 to 80% is seen in torque output compared to a crank slider mechanism. This is because the higher pressure level of the Invention is harnessed by its higher efficiency and acts upon a larger crank. Given the significant gain in torque output, a present engine will only need a fraction of the fuel burned to generate the same amount of torque as a crank slider mechanism engine.

For most engine applications, these advantages outweigh the higher complexity, cost, and reciprocating weight as compared to a crank slider mechanism and will result in very substantial fuel cost savings for each year of operation of the engine.

Various features of the various embodiments disclosed herein can be combined in different combinations to create new embodiments within the scope of the present invention. That is, one or more features from one or more of the embodiments can be combined with one or more features of one or more other embodiments to create new embodiments within the scope of the present invention. Any ranges given herein include any and all specific values within the range and any and all ranges within the given range.

The foregoing is a description of embodiments of the invention which are given here by way of example only. The invention is not to be taken as limited to any of the specific features as described, but comprehends all such variations thereof as come within the scope of the appended claims.

REFERENCE NUMERALS 10 engine
11 casing
12 cylinder
13 crankshaft support
14 bore
16 piston
18 crankshaft
20 main bearing journal
22 crankpin
24 crank web
26 multi-linkage connecting rod mechanism
28 connecting rod
30 connecting rod first end
32 connecting rod second end
34 first hinge link
36 first hinge link first end
38 first hinge link second end
40 crankpin link
42 crankpin link first end
44 crankpin link second end
46 second hinge link
48 second hinge link first end
50 second hinge link second end
52 third hinge link
54 third hinge link first end
56 third hinge link second end
58 pin
60 pin
62 pin
64 pin
66 first hinge link stop face
68 third hinge link stop face
70 second hinge link stop face
72 crankpin link stop face 74 force transfer mechanism
76 pivot link
78 pivot link first end
79 pivot point
80 pivot link second end
82 third pivot connection
84 engine
86 multi-linkage connecting rod mechanism
88 first hinge link
90 first hinge link first end
92 first hinge link second end
94 third pivot connection
96 first gear portion
98 retention mechanism
100 side plate
102 side plate first end
104 side plate second end
106 side plate first slot
108 side plate second slot
110 side plate connector
111 force transfer mechanism
112 pivot link
114 pivot link second end
116 second gear portion
118 retention bore
120 retention pin
122 retention pin
124 engine
126 multi-linkage connecting rod mechanism
128 force transfer mechanism
130 third pivot connection
132 connecting rod
134 hinge link
136 moving pivot point mechanism
138 movable mount
140 pivot
142 body
144 guide path
145 guide path device
146 pivot bore
148 locking detent
150 locking pin
151 locking pin locking portion
152 locking bore
153 driven surface
154 locking mechanism
156 crankshaft
158 first cam mechanism
160 first cam path
162 second cam mechanism
164 second cam path
166 second cam follower
167 second cam follower cam engaging surface
168 second cam follower driving surface
170 spring
172 motion control mechanism
180 motion control linkage
182 first cam follower
184 first cam follower driving surface
186 rocker arm
188 pivot
190 rocker arm first end
192 rocker arm second end
194 cam follower housing
196 first cam follower slot
198 second cam follower slot
200 locking pin slot
202 straight slot portion
207 engine
208 multi-linkage connecting rod mechanism
209 force transfer mechanism
210 first gear portion
212 connecting rod
214 engine
215 force transfer mechanism
216 moving pivot point mechanism
218 motion control mechanism
220 locking mechanism
222 crankshaft
224 first cam mechanism
226 first cam path
228 second cam mechanism
230 second cam path
232 movable mount
234 pivotal connection
235 movable mount axis
236 pivoting pivot link connection
237 guide element
238 arcuate path
240 pivot bore
242 center bore
244 counterbalance portion
246 locking surface
248 locking pin
250 moving pivot point housing
252 recessed portion
254 boss portion
256 second cam follower slot
258 second cam follower
260 locking pin slot
262 locking pin
264 pocket portion
266 cam engaging surface
268 ramped driving surface
270 spring
274 locking pin driven surface
276 locking pin engaging surface
278 motion control linkage
280 first cam follower
281 first cam follower slot
282 first cam follower driving surface
284 rocker arm
286 pivot mount
288 rocker arm first end
290 rocker arm second end
292 cam follower housing
296 engine
298 first gear portion
300 connecting rod
301 multi-linkage connecting rod mechanism
302 retention mechanism
304 idler roller
306 slider
308 slider slot
309 connecting rod
310 piston control mechanism
312 control button
314 control recess
316 control island

The invention claimed is:

1. A fluid flow machine, comprising:
a casing including a cylinder and a crankshaft support;
a piston slidably disposed in the cylinder for reciprocating along the cylinder;

a crankshaft rotationally supported in the crankshaft support and including a crankpin radially offset from an axis of the crankshaft;

a multi-linkage connecting rod mechanism comprising:
- a connecting rod having a first end connected to the piston and a second end opposite the first end, the connecting rod for reciprocating with the piston;
- a crankpin link including a first end pivotally connected to the connecting rod second end and a second end rotationally connected to the crankpin;

a force transfer mechanism connecting the multi-linkage connecting rod mechanism to the casing for transferring a vertical piston force into a horizontal crankpin force;

wherein the multi-linkage connecting rod mechanism includes a first gear portion and the force transfer mechanism includes a second gear portion engaging the first gear portion in a meshing connection such that the multi-linkage connecting rod mechanism pivots with respect to the force transfer mechanism as the connecting rod reciprocates.

2. The fluid flow machine of claim 1 and further comprising:
wherein the multi-linkage connecting rod mechanism further comprises:
a first hinge link including a first end pivotally connected to the connecting rod second end and a second end opposite the first hinge link first end;
a second hinge link including a first end pivotally connected to the first hinge link second end and a second end, opposite the second hinge link first end, pivotally connected to the crankpin link first end;
wherein the force transfer mechanism further comprises:
a pivot link including a first end pivotally connected to the casing and a second end pivotally connected to the multi-linkage connecting rod mechanism.

3. The fluid flow machine of claim 2 and further comprising:
wherein the multi-linkage connecting rod mechanism further comprises:
a third hinge link connecting the crankpin link to the second hinge link, the third hinge link including a first end pivotally connected to the second hinge link second end and a second end opposite the third hinge link first end pivotally connected to the crankpin link first end.

4. The fluid flow machine of claim 2, wherein at least one chosen from the connecting rod and the first hinge link includes a third pivot connection, the pivot link second end pivotally connected to the third pivot connection.

5. The fluid flow machine of claim 4, wherein the third pivot connection is positioned on a major thrust side of the at least one chosen from the connecting rod and the first hinge link and the pivot link first end is pivotally connected to the casing on the major thrust side of the at least one chosen from the connecting rod and the first hinge link.

6. The fluid flow machine of claim 5, and further comprising at least one stop face positioned on at least one chosen from the connecting rod, the first hinge link, the second hinge link and the crankpin link limiting an amount of pivot of at least one chosen from the connecting rod, the first hinge link, the second hinge link and the crankpin link to another of the at least one chosen from the connecting rod, the first hinge link, the second hinge link and the crankpin link.

7. The fluid flow machine of claim 6, wherein the at least one stop face provides a maximum pivot of no more than 90° between a longitudinal axis of the connecting rod and a longitudinal axis of the crankpin link.

8. The fluid flow machine of claim 7, wherein the first hinge link includes the third pivot connection positioned intermediate the first hinge link first end and second end, the third pivot connection is positioned on a major thrust side of the first hinge link and the pivot link first end is pivotally connected to the casing on a major thrust side of the first hinge link; wherein each of the connecting rod, the first hinge link, the second hinge link and the crankpin link include at least one stop face for engaging an adjacent stop face to limit pivoting of the longitudinal axis of the connecting rod and the longitudinal axis of the crankpin link in at least one direction.

9. The fluid flow machine of claim 5, and further comprising:
a moving pivot point mechanism connecting the pivot link first end to the casing, the moving pivot point mechanism including:
a movable mount, the pivot link first end being connected to the movable mount;
a guide path device attached to the casing and having a guide path connecting to the movable mount and providing a defined path along which the movable mount can travel;
a motion control mechanism for controlling movement of the movable mount, the motion control mechanism including:
a first cam mechanism driven by the crankshaft and having a first cam path;
a motion control linkage operatively connected between the first cam path and the movable mount to allow the first cam path to control movement of the movable mount, the first cam path being constructed and arranged to allow the movable mount to move along the guide path in a direction away from the multi-linkage connecting rod mechanism on a first portion of an upstroke of the piston and then to allow the movable mount to move along the guide path in a direction toward the multi-linkage connecting rod mechanism on a later second portion of the upstroke of the piston.

10. The fluid flow machine of claim 9, wherein the motion control linkage further comprises:
a first cam follower engaging the first cam path, the first cam follower including a driving surface;
a rocker arm pivotally mounted to the casing and having a first end connecting with the movable mount and a second end opposite the first end connecting with the first cam follower driving surface.

11. The fluid flow machine of claim 10, and further comprising:
a housing connected to the casing including:
a first cam follower slot slidably receiving the first cam follower;
wherein the guide path device guide path includes a straight slot slidably receiving the movable mount;
wherein the movable mount is a sliding block including a pivot bore connecting to the pivot link;
wherein the first cam mechanism is positioned on the crankshaft, and the first cam follower slot is aligned radially with respect to an axis of the crankshaft.

12. The fluid flow machine of claim 11, and further comprising:
a locking mechanism for connecting with the movable mount for locking the movable mount in a locked position, the locking mechanism including:

a locking pin being driven by the crankshaft to engage a portion of the movable mount when the movable mount is moved to the locked position to lock the movable mount in the locked position, the locking pin also being driven by the crankshaft to disengage the portion of the movable mount when the piston is on a downstroke of the piston;

a second cam mechanism driven by the crankshaft and having a second cam path;

a second cam follower engaging between the second cam path and the locking pin, the second cam follower including a driving surface;

wherein the locking pin includes a driven surface for engaging the second cam follower driving surface such that movement of the second cam follower in a locking direction causes the locking pin to move toward engagement with the movable mount and movement of the second cam follower away from the locking direction allows the locking pin to move away from engagement with the movable mount;

wherein the housing further includes:
a second cam follower slot slidably receiving the second cam follower;
a locking pin slot slidably receiving the locking pin;
wherein the movable mount includes a locking detent for engaging the locking pin;
wherein the second cam mechanism is positioned on the crankshaft, the second cam follower slot is aligned radially with respect to the axis of the crankshaft and the locking pin slot is aligned normal to the second cam follower slot.

13. The fluid flow machine of claim 5, and further comprising:
a moving pivot point mechanism connecting the pivot link first end to the casing, the moving pivot point mechanism including:
a movable mount, the pivot link first end being connected to the movable mount;
a motion control mechanism for controlling movement of the movable mount, the motion control mechanism including:
a first cam mechanism driven by the crankshaft and having a first cam path;
a motion control linkage operatively connected between the first cam path and the movable mount to allow the first cam path to control movement of the movable mount, the first cam path being constructed and arranged to allow the movable mount to move along a guide path in a direction away from the multi-linkage connecting rod mechanism on a first portion of an upstroke of the piston and then to allow the movable mount to move along the guide path in a direction toward the multi-linkage connecting rod mechanism on a later second portion of the upstroke of the piston;
wherein the movable mount is pivotally connected to the casing to pivot about a movable mount axis and includes:
a pivoting pivot link connection connected to the pivot link first end, the pivot link connection positioned radially outward of the movable mount axis such that pivoting of the movable mount about the movable mount axis causes the pivot link connection to move along a curved guide path;
a counterbalance portion opposite the movable mount axis from the pivoting link connection.

14. The fluid flow machine of claim 1, and further comprising a retention mechanism connected between the multi-linkage connecting rod mechanism and the force transfer mechanism to maintain the first gear portion in meshing engagement with the second gear portion throughout a range of pivoting of the multi-linkage connecting rod mechanism with respect to the force transfer mechanism.

15. The fluid flow machine of claim 14, wherein one of the first gear portion and the second gear portion is a curved non-circular gear having a different radius in an x-axis than a y-axis and the other of the first gear portion and the second gear portion is a rack gear.

16. The fluid flow machine of claim 15, wherein the retention mechanism includes at least one side plate having a first end and a second end, the at least one side plate fixedly attached on the first end to one of the multi-linkage connecting rod mechanism and the force transfer mechanism, the at least one side plate including a pair of spaced apart slots positioned on the second end, the other of the multi-linkage connecting rod mechanism and the force transfer mechanism including a pair of pins engaging the pair of spaced apart slots, respectively, to maintain the curved non-circular gear in meshing engagement with the rack gear throughout a range of pivoting of the multi-linkage connecting rod mechanism with respect to the force transfer mechanism.

17. The fluid flow machine of claim 16, wherein the curved non-circular gear is positioned on the force transfer mechanism and the rack gear is positioned on the multi-linkage connecting rod mechanism; wherein the at least one side plate is fixedly attached on the first end to the multi-linkage connecting rod mechanism; wherein the force transfer mechanism includes the pair of pins.

18. The fluid flow machine of claim 1, wherein the force transfer mechanism includes a pivot link including a first end pivotally connected to the casing and a second end pivotally connected to the multi-linkage connecting rod mechanism and further comprising a retention mechanism connected between the multi-linkage connecting rod mechanism and the pivot link to maintain the first gear portion in meshing engagement with the second gear portion throughout a range of pivoting of the multi-linkage connecting rod mechanism with respect to the pivot link.

19. The fluid flow machine of claim 18, wherein one of the first gear portion and the second gear portion is a curved non-circular gear having a different radius in an x-axis than a y-axis and the other of the first gear portion and the second gear portion is a rack gear.

20. The fluid flow machine of claim 19, wherein the retention mechanism includes at least one side plate having a first end and a second end, the at least one side plate fixedly attached on the first end to one of the multi-linkage connecting rod mechanism and the pivot link, the at least one side plate including a pair of spaced apart slots positioned on the second end, the other of the multi-linkage connecting rod mechanism and the pivot link including a pair of pins engaging the pair of spaced apart slots, respectively, to maintain the curved non-circular gear in meshing engagement with the rack gear throughout a range of pivoting of the multi-linkage connecting rod mechanism with respect to the pivot link.

21. The fluid flow machine of claim 20, wherein the curved non-circular gear is positioned on the pivot link and the rack gear is positioned on the connecting rod; wherein the at least one side plate is fixedly attached on the first end to the connecting rod; wherein the pivot link includes the pair of pins.

22. The fluid flow machine of claim 1, and further comprising a retention mechanism, including:

a movable support configured to move along a support path connected to the casing;
an idler roller rotatably mounted on the movable support and biased against a side of the connecting rod to maintain the first gear portion in meshing engagement with the second gear portion.

23. The fluid flow machine of claim 22, and further comprising a piston control mechanism, including:
a control recess connected to the casing;
a control button attached to the connecting rod for engaging the control recess;
the engagement between the control button and the control recess defining an outer path that the control button and the connecting rod can travel on the upstroke of the piston and connecting rod to limit an upward travel of the piston as the piston approaches TDC to prevent over-excursion of the piston.

24. The fluid flow machine of claim 23, wherein the piston control mechanism further includes:
a control island positioned in the control recess for interacting with the control button to change an angle of the hinge links of the multi-linkage connecting rod mechanism as the multi-linkage connecting rod mechanism is raised, bending the hinge links into position for a next power stroke.

25. A fluid flow machine, comprising:
a casing including a cylinder and a crankshaft support;
a piston slidably disposed in the cylinder for reciprocating along an axis of the cylinder;
a crankshaft including a main bearing journal rotationally supported in the crankshaft support, a crankpin radially offset from an axis of the main bearing journal and a crank web connecting the main bearing journal and the crankpin;
a multi-linkage connecting rod mechanism comprising:
a connecting rod having a first end connected to the piston and a second end opposite the first end, the connecting rod for reciprocating with the piston;
a crankpin link including a first end pivotally connected to the connecting rod second end and a second end rotationally connected to the crankpin;
a force transfer mechanism connecting the multi-linkage connecting rod mechanism to the casing for transferring a vertical piston force into a horizontal crankpin force, the force transfer mechanism comprising a pivot link including a first end pivotally connected to the casing and a second end pivotally connected to the multi-linkage connecting rod mechanism;
wherein the multi-linkage connecting rod mechanism includes a first gear portion and the pivot link second end includes a second gear portion engaging the first gear portion in a meshing connection such that the multi-linkage connecting rod mechanism pivots with respect to the force transfer mechanism as the connecting rod reciprocates.

26. The fluid flow machine of claim 25, and further comprising a retention mechanism connected between the multi-linkage connecting rod mechanism and the pivot link to maintain the first gear portion in meshing engagement with the second gear portion throughout a range of pivoting of the multi-linkage connecting rod mechanism with respect to the pivot link.

27. The fluid flow machine of claim 26, wherein one of the first gear portion and the second gear portion is a curved non-circular gear having a different radius in an x-axis than a y-axis and the other of the first gear portion and the second gear portion is a rack gear.

28. The fluid flow machine of claim 27, wherein the retention mechanism includes at least one side plate having a first end and a second end, the at least one side plate fixedly attached on the first end to one of the multi-linkage connecting rod mechanism and the pivot link, the at least one side plate including a pair of spaced apart slots positioned on the second end, the other of the multi-linkage connecting rod mechanism and the pivot link including a pair of pins engaging the pair of spaced apart slots, respectively, to maintain the curved non-circular gear in meshing engagement with the rack gear throughout a range of pivoting of the multi-linkage connecting rod mechanism with respect to the pivot link.

29. The fluid flow machine of claim 25, and further comprising:
a moving pivot point mechanism connecting the pivot link first end to the casing, the moving pivot point mechanism including:
a movable mount, the pivot link first end being connected to the movable mount.

30. The fluid flow machine of claim 29, wherein the moving pivot point mechanism includes:
a motion control mechanism for controlling movement of the movable mount, the motion control mechanism allowing the movable mount to move along a guide path in a direction away from the multi-linkage connecting rod mechanism during a first portion of movement of the piston and then to allow the movable mount to move along the guide path in a direction toward the multi-linkage connecting rod mechanism on a later second portion of movement of the piston during an upstroke of the piston.

31. The fluid flow machine of claim 30, wherein the motion control mechanism includes a biasing mechanism connected to the movable mount for controlling the movement of the movable mount.

32. The fluid flow machine of claim 29, wherein the movable mount is pivotally connected to the casing to pivot about a movable mount axis and includes a pivoting pivot link connection connected to the pivot link first end, the pivot link connection positioned radially outward of the movable mount axis such that pivoting of the movable mount about the movable mount axis causes the pivot link connection to move along a curved guide path.

33. The fluid flow machine of claim 29, wherein the movable mount is pivotally connected to the casing to pivot about a movable mount axis and includes a pivoting pivot link connection connected to the pivot link first end, the pivot link connection positioned radially outward of the movable mount axis such that pivoting of the movable mount about the movable mount axis causes the pivot link connection to move along a curved guide path.

34. The fluid flow machine of claim 33, wherein pivoting of the movable mount about the movable mount axis causes the pivot link connection to move along an arcuate guide path, the movable mount including a counterbalance portion opposite the movable mount axis from the pivot link connection.

35. A fluid flow machine, comprising:
a casing including a cylinder and a crankshaft support;
a piston disposed in the cylinder for reciprocating along the cylinder;
a crankshaft rotationally supported in the crankshaft support and including a crankpin radially offset from an axis of the crankshaft;
a multi-linkage connecting rod mechanism comprising:

a connecting rod having a first end connected to the piston and a second end opposite the first end, the connecting rod for reciprocating with the piston;

a crankpin link including a first end pivotally connected to the connecting rod second end and a second end rotationally connected to the crankpin;

a force transfer mechanism connecting the multi-linkage connecting rod mechanism to the casing for transferring a vertical piston force into a horizontal crankpin force;

wherein the multi-linkage connecting rod mechanism includes a first toothed portion and the force transfer mechanism includes a second toothed portion engaging the first toothed portion such that the multi-linkage connecting rod mechanism pivots with respect to the force transfer mechanism as the connecting rod reciprocates.

36. The fluid flow machine of claim 35, and further comprising a retention mechanism connected between the multi-linkage connecting rod mechanism and the force transfer mechanism to maintain the first toothed portion in engagement with the second toothed portion throughout a range of pivoting of the multi-linkage connecting rod mechanism with respect to the force transfer mechanism.

37. The fluid flow machine of claim 36, wherein the retention mechanism includes at least one side plate having a first end and a second end, the at least one side plate fixedly attached on the first end to one of the multi-linkage connecting rod mechanism and the force transfer mechanism, the at least one side plate including at least one slot positioned on the second end, the other of the multi-linkage connecting rod mechanism and the force transfer mechanism including a pair of pins engaging the at least one slot, respectively, to maintain the first toothed portion in engagement with the second toothed portion throughout a range of pivoting of the multi-linkage connecting rod mechanism with respect to the force transfer mechanism.

38. The fluid flow machine of claim 37, and further comprising:

wherein the force transfer mechanism comprises a pivot link including a first end pivotally connected to the casing and a second end pivotally connected to the multi-linkage connecting rod mechanism, the pivot link second end including the second toothed portion;

a moving pivot point mechanism connecting the pivot link first end to the casing, the moving pivot point mechanism including:

a movable mount, the pivot link first end being connected to the movable mount.

39. The fluid flow machine of claim 38, wherein the movable mount is pivotally connected to the casing to pivot about a movable mount axis and includes a pivoting pivot link connection connected to the pivot link first end, the pivot link connection positioned radially outward of the movable mount axis such that pivoting of the movable mount about the movable mount axis causes the pivot link connection to move along a curved guide path.

40. The fluid flow machine of claim 39, wherein one of the first toothed portion and the second toothed portion has a curved non-circular shape having a different radius in an x-axis than a y-axis and the other of the first toothed portion and the second toothed portion has a linear shape.

41. The fluid flow machine of claim 40, wherein the curved non-circular shape toothed portion is positioned on the pivot link and the linear shape toothed portion is positioned on the multi-linkage connecting rod mechanism; wherein the at least one side plate is fixedly attached on the first end to the multi-linkage connecting rod mechanism; wherein the pivot link includes the pair of pins.

42. The fluid flow machine of claim 41, wherein the linear shape toothed portion is positioned on the connecting rod on a major thrust side of the connecting rod and the pivot link is pivotally connected to the casing on the major thrust side of the connecting rod.

* * * * *